United States Patent
Andermo et al.

[11] Patent Number: 6,049,204
[45] Date of Patent: Apr. 11, 2000

[54] ELECTRONIC LINEAR SCALE USING A REDUCED OFFSET HIGH ACCURACY INDUCED CURRENT POSITION TRANSDUCER

[75] Inventors: Nils Ingvar Andermo, Kirkland; Karl G. Masreliez, Bellevue, both of Wash.

[73] Assignee: Mitutoyo Corporation, Kanagawa, Japan

[21] Appl. No.: 08/975,650

[22] Filed: Nov. 21, 1997

[51] Int. Cl.[7] .............................. G01B 7/14; G01B 7/30
[52] U.S. Cl. .............................. 324/207.17; 324/207.12; 324/207.24; 340/870.32; 336/45; 336/75
[58] Field of Search ........... 324/207.22, 207.15–207.19, 324/207.24, 207.12; 336/45, 130, 131, 136, 75; 340/870.32, 870.33, 870.35, 870.36; 318/653–655, 657; 341/15

[56] References Cited

U.S. PATENT DOCUMENTS 5,841,274  11/1998  Masreliez et al. ................ 324/207.17

FOREIGN PATENT DOCUMENTS

WO 95/31696  11/1995  WIPO .
WO 97/19323  5/1997  WIPO .

Primary Examiner—Jay Patidar
Attorney, Agent, or Firm—Oliff & Berridge, PLC

[57] ABSTRACT

An electronic linear scale having a reduced offset position transducer that uses at least one coupling loop on a scale to inductively couple a transmitter winding on a read head to one or more receiver windings on the read head. The transmitter winding generates at least one primary magnetic field. The transmitter winding is inductively coupled to first loop portions of the coupling loops by the primary magnetic field. Second loop portions of the coupling loops generate secondary magnetic fields. Each receiver winding is inductively coupled to the second loop portions of the coupling loops by the secondary magnetic fields. At least one of the transmitter winding or the receiver windings is formed in a periodic pattern complementary to the dimensions of the coupling loops. Prescribed winding configurations are used to reduce the effects of extraneous inductive coupling in the device. Depending on the relative position between the read head and the scale, the receiver windings inductively couple to the second loop portions of the coupling loops to various degrees. A compact, high accuracy, high resolution inductive position sensor results. Low power operation is possible.

38 Claims, 16 Drawing Sheets

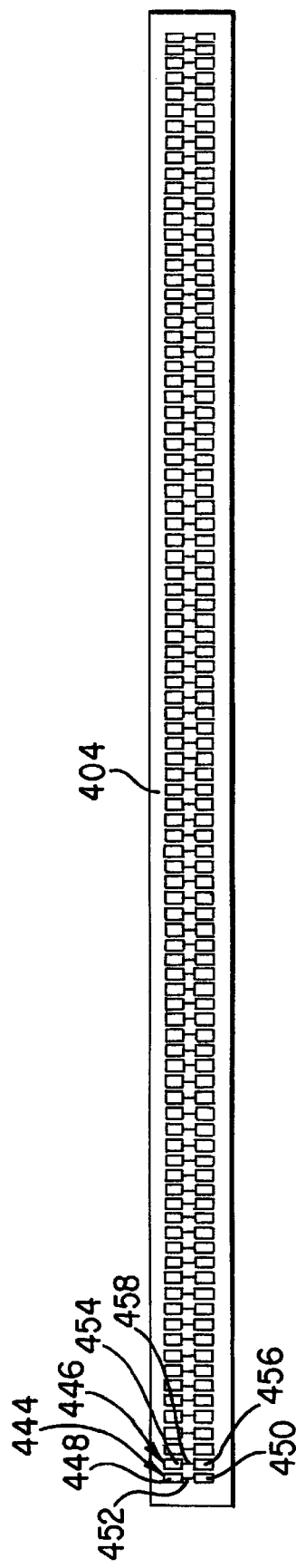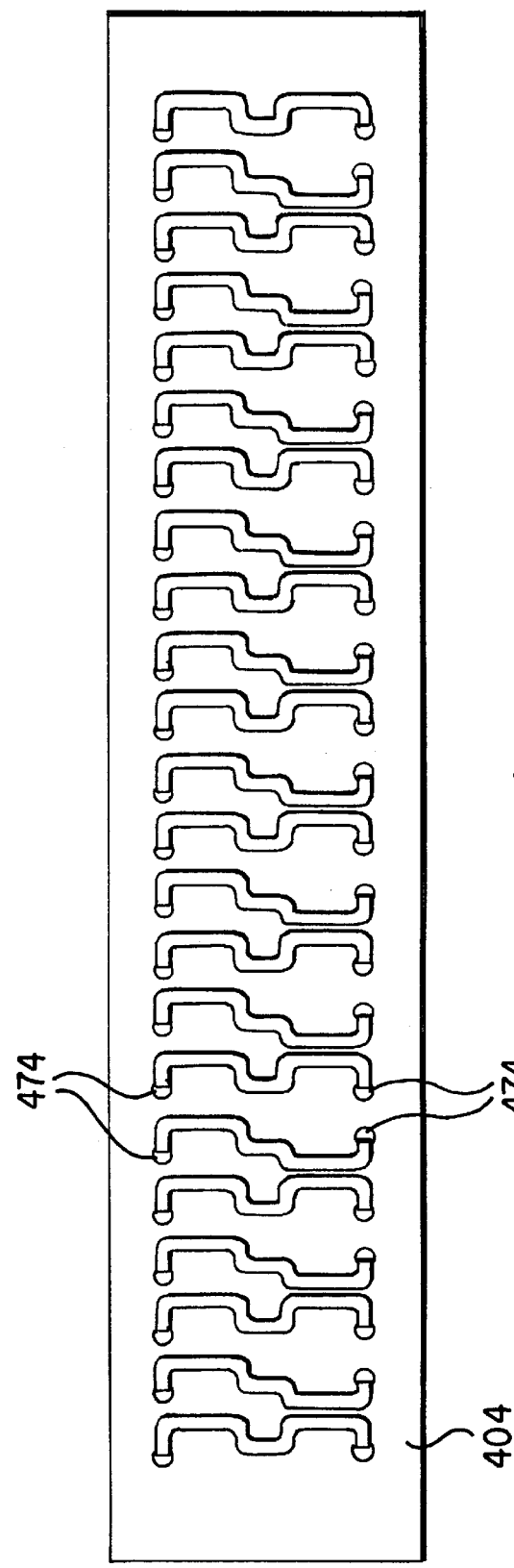

ELECTRONIC LINEAR SCALE USING A REDUCED OFFSET HIGH ACCURACY INDUCED CURRENT POSITION TRANSDUCER

BACKGROUND OF THE INVENTION

1. Field of Invention

This invention relates to an electronic linear scale. More particularly, this invention is directed to electronic linear scales using a reduced offset high accuracy induced current position transducer.

2. Description of Related Art

U.S. patent application Ser. No. 08/645,490, filed May 13, 1996, and incorporated herein in its entirety, discloses an electronic linear scale using an inductive position transducer. The '490 application discloses signal processing techniques for induced current position transducers.

The operation of the electronic linear scale using the inductive position transducer described in the '490 application is generally shown in FIGS. 1, 2, and 3. As shown in FIG. 1, an electronic linear scale 100 includes an elongated beam 102 and a slider assembly 120. The beam 102 is a rigid or semi-rigid bar having a generally rectangular cross section.

During operation, the slider assembly 120 is installed in close proximity to scale 104 without contacting any components on the beam 102 itself. Both the beam 102 and the slider assembly 120 may be affixed to other objects in a variety of configurations. In this manner, the linear scale 100 measures the position of the slider assembly 120 relative to the beam 102, thereby also measuring the relative position between any mechanical fixtures to which these two components are attached.

Ultimately, the scale 104 may be fabricated of a flexible or rigid dimensionally stable material. The scale 104 can be applied directly to a mechanical fixture with clamps or adhesive, thus eliminating the beam 102. The scale 104 and the beam 102 are preferably, but not necessarily, nonconductive. The slider assembly 120 inductively monitors its own position relative to the scale 104.

The scale 104 is an elongated printed circuit board 106. As shown in FIG. 1, a set of magnetic flux modulators 108 are spaced apart along the printed circuit board 106 in a periodic pattern. A display cable 110 is also shown in FIG. 1.

As shown in FIG. 2, the measurement generated by the linear scale is displayed on a conventional digital display 112 mounted on the digital display unit 114. A pair of pushbutton switches 116 and 118 are also mounted on the digital display unit 114. The switch 116 turns on and off the signal processing electronics 122 and the digital display unit 114. The switch 118 resets the origin of the slider assembly 120 to its current position relative to the scale 104. Alternately, the position information from the slider assembly 120 may be routed to other types of electronic control systems or displays. The slider assembly 120 includes a slider housing 124, which holds the read head 130 in close proximity to the flux modulators 108 on the beam 102 without making contact.

The slider assembly 120 also includes a substrate 126, such as a conventional printed circuit board. The signal processing electronics 122 are preferably mounted on an upper surface of the substrate 126, although a portion of the signal processing electronics may be placed on the interior side of the read head 130, as an alternative (not shown). The contents of the slider housing 124 are protected by a cover 128. A ribbon-like read head connector 132 electrically connects the read head 130 to the signal processing electronics 122. The display cable 110 is attached to the signal processing electronics 122 inside the housing 124 by conventional means.

As shown in FIG. 3, the plurality of magnetic flux modulators 108 are distributed along a measuring axis 134 of the elongated beam 102 at a pitch equal to a wavelength $\lambda$, which is described in more detail below. The flux modulators 108 have a nominal width along the measuring axis 134 of $\lambda/2$. The flux modulators 108 have a width d in a direction perpendicular to the measuring axis 134.

The read head 130 includes a generally rectangular transmitter winding 136 that is connected to a drive signal generator 138. The drive signal generator 138 provides a time-varying drive signal to the transmitter winding 136. The time-varying drive signal is preferably a high frequency sinusoidal signal, a pulse signal or an exponentially decaying sinusoidal signal. When the time-varying drive signal is applied to the transmitter winding 136, the time-varying current flowing in the transmitter winding 136 generates a corresponding time-varying, or changing, magnetic field. Because the transmitter winding 136 is generally rectangularly shaped, the generated magnetic field is substantially constant within a flux region in the central portion of the transmitter winding 136.

The read head 130 further includes a first receiver winding 140 and a second receiver winding 142 positioned on the read head 130 within the flux region inside the transmitter winding 136. Each of the first receiver winding 140 and the second receiver winding 142 is formed by a plurality of first loop segments 144 and second loop segments 146. The first loop segments 144 are formed on a first surface of a layer of the printed circuit board 130. The second loop segments 146 are formed on another surface of the layer of the printed circuit board 130. The layer of the printed circuit board 130 acts as an electrical insulation layer between the first loop segments 144 and the second loop segments 146. Each end of the first loop segments 144 is connected to one end of one of the second loop segments 146 through feed-throughs 148 formed in the layer of the printed circuit board 130.

The first and second loop segments 144 and 146 are preferably sinusoidally shaped. Accordingly, as shown in FIG. 3 the first and second loop segments 144 and 146 forming each of the receiver windings 140 and 142 form a sinusoidally shaped periodic pattern having a wavelength B. Each of the receiver windings 140 and 142 are thus formed having a plurality of loops 150 and 152.

The loops 150 and 152 in each of the first and second receiver windings 140 and 142 have a width along the measuring axis 134 equal to $\lambda/2$. Thus, each pair of adjacent loops 150 and 152 has a width equal to $\lambda$. Furthermore, the first and second loop segments 144 and 146 go through a full sinusoidal cycle in each pair of adjacent loops 150 and 152. Thus, $\lambda$ corresponds to the sinusoidal wavelength of the first and second receiver windings 140 and 142. Furthermore, the second receiver winding 142 is offset by $\lambda/4$ from the first receiver winding 140 along the measuring axis 134. That is, the first and second receiver windings 140 and 142 are in quadrature.

The changing drive signal from the drive signal generator 138 is applied to the transmitter winding 136 such that current flows in a transmitter winding 136 from a first terminal 136a, through the transmitter winding 136 and out through a second terminal 136b. Thus, the magnetic field generated by the transmitter winding 136 descends into the plane of FIG. 3 within the transmitter winding 136 and rises up out of the plane of FIG. 3 outside the transmitter winding 136. Accordingly, the changing magnetic field within the transmitter winding 1 generates an induced electromagnetic force (EMF) in each of the loops 150 and 152 formed in the receiver windings 140 and 142.

The loops 150 and 152 have opposite winding directions. Thus, the EMF induced in the loops 150 has a polarity that is opposite to the polarity of the EMF induced in the loops 152. The loops 150 and 152 enclose the same size areas and thus nominally the same amount of magnetic flux. Therefore, the absolute magnitude of the EMF generated in each of the loops 150 and 152 is nominally the same.

There are preferably equal numbers of loops 150 and 152 in each of the first and second receiver windings 140 and 142. Ideally, the positive polarity EMF induced in the loops 150 is exactly offset by the negative polarity EMF induced in the loops 152. Accordingly, the net nominal EMF on each of the first and second receiver windings 140 and 142 is zero. Thus no signal should be output from the first and second receiver windings 140 and 142 as a result solely of the direct coupling from the transmitter winding 136 to the receiver windings 140 and 142.

When the read head 130 is placed in proximity to the scale 104, the changing magnetic flux generated by the transmitter winding 136 also passes through the flux modulators 108. The flux modulators 108 modulate the changing magnetic flux and can be either flux enhancers or flux disrupters.

When the flux modulators 108 are provided as flux disrupters, the flux modulators 108 are formed as conductive plates or thin conductive films on the scale 104. As the changing magnetic flux passes through the conductive plates or thin films, eddy currents are generated in the conductive plates or thin films. These eddy currents in turn generate magnetic fields having a field direction that is opposite to that of the magnetic field generated by the transmitter winding 136. Thus, in areas proximate to each of the flux disrupter-type flux modulators 108, the net magnetic flux is less than the net magnetic flux in areas distant from the flux disrupter type flux modulators 108.

When the scale 104 is positioned relative to the read head 130 such that the flux disrupters 108 are aligned with the positive polarity loops 150 of the receiver winding 140, the net EMF generated in the positive polarity loops 150 is reduced compared to the net EMF generated in the negative polarity loops 152. Thus, the receiver winding 140 becomes unbalanced and has a net negative signal across its output terminals 140a and 140b.

Similarly, when the flux disrupters 108 are aligned with the negative polarity loops 152, the net magnetic flux through the negative polarity loops 152 is disrupted or reduced. Thus, the net EMF generated in the negative polarity loops 152 is reduced relative to the net EMF generated in the positive polarity loops 150. Thus, the first receiver winding 140 has a net positive signal across its output terminals 140a and 140b.

When the flux modulators 108 are provided as flux enhancers, this result is exactly reversed. The flux enhancer type flux modulators 108 are formed by portions of high magnetic permeability material provided in or on the scale 104. The magnetic flux generated by the transmitter winding 136 preferentially passes through the high magnetic permeability flux enhancer type flux modulators 108. That is, the density of the magnetic flux within the flux enhancers 108 is enhanced, while the flux density in areas outside the flux enhancers 108 is reduced.

Thus, when the flux enhancers 108 are aligned with the positive polarity loops 150 of the second receiver winding 142, the flux density through the positive polarity loops 150 is greater than a flux density passing through the negative polarity loops 152. Thus, the net EMF generated in the positive polarity 150 increases, while the net EMF induced in the negative polarity loops 152 decreases. This appears as a positive signal across the terminals 142a and 142b of the second receiver winding 142.

When the flux enhancers 108 are aligned with the negative polarity loops 152 of the second receiver winding 142, the negative polarity loops 152 generate an enhanced EMF relative to the EMF induced in the positive polarity loops 150. Thus, a negative signal appears across the terminals 142a and 142b of the second receiver winding 142. It should also be appreciated that, as outlined in the incorporated reference, both the flux enhancing and flux disrupting effects can be combined in a single scale, where the flux enhancers and flux disrupters are interleaved along the length of the scale 104. This would act to enhance the modulation of the induced EMF, because the effects of both types of flux modulators additively combine.

As indicated above, the width and height of the flux modulators 108 are nominally $\lambda/2$ and d, respectively, while the pitch of the flux modulators 108 is nominally $\lambda$. Similarly, the wavelength of the periodic pattern formed in the first and second receiver windings 140 and 142 is nominally $\lambda$ and the height of the loops 150 and 152 is nominally d. Furthermore, each of the loops 150 and 152 enclose nominally the same area.

FIG. 4A shows the position-dependent output from the positive polarity loops 150 as the flux modulators 108 move relative to the positive polarity loops 150. Assuming the flux modulators 108 are flux disrupters, the minimum signal amplitude corresponds to those positions where the flux disrupters 108 exactly align with the positive polarity loops 150, while the maximum amplitude positions correspond to the flux disrupters 108 being aligned with the negative polarity loops 152.

FIG. 4B shows the signal output from each of the negative polarity loops 152. As with the signal shown in FIG. 4A, the minimum signal amplitude corresponds to those positions where the flux disrupters 108 exactly align with the positive polarity loops 150, while the maximum signal output corresponds to those positions where the flux disrupters exactly align with the negative polarity loops 152. It should be appreciated that if flux enhancers were used in place of flux disrupters, the minimum signal amplitudes in FIGS. 4A and 4B would correspond to the flux enhancers 108 aligning with the negative polarity loops 152, while the maximum signal amplitude would correspond to the flux enhancers 108 aligning with the positive polarity loops 150.

FIG. 4C shows the net signal output from either of the first and second receiver windings 140 and 142. This net signal is equal to the sum of the signals output from the positive and negative polarity loops 150 and 152, i.e., the sum of the signal shown in FIGS. 4A and 4B. The net signal shown in FIG. 4C should ideally be symmetrical around zero, that is, the positive and negative polarity loops 132 and 134 should be exactly balanced to produce a symmetrical output with zero offset.

However, a "DC" (position independent) component often appears in the net signal in a real device. This DC component is the offset signal $V_o$. This offset $V_o$ is an extraneous signal component that complicates signal processing and leads to undesirable position measurement errors. This offset has two major sources.

First, the full amplitude of the transmitter field passes through the first and second receiver windings 140 and 142. As outlined above, this induces a voltage in each loop 150 and 152. The induced voltage nominally cancels because the loops 150 and 152 have opposite winding directions. However, to perfectly cancel the induced voltage in the receiver windings requires the positive and negative loops 150 and 152 to be perfectly positioned and shaped, for a perfectly balanced result. The tolerances on the balance are critical because the voltages induced directly into the receiver winding loops 140 and 142 by the transmitter winding 136 are much stronger than the modulation in the induced voltage caused by the flux modulators 108. In practice, fabrication tolerances always prevent perfect balance.

Second, the spatially modulated field created by the flux modulators 108 also exhibits an average position-independent offset component. That is, the flux modulators 108 within the magnetic field generated by the transmitter winding 136 all create the same polarity spatial modulation in the magnetic field. For example, when flux disrupters are used, the induced eddy current field from the flux modulators has an offset because the flux disrupters within the transmitter field all create a same polarity secondary magnetic field. At the same time, the space between the flux disrupters does not create a secondary magnetic field.

Thus, each positive polarity loop 150 and each negative polarity loop 152 of the receiver windings 140 and 142 sees a net magnetic field that varies between a minimum value and a maximum value having the same polarity. The mean value of this function is not balanced around zero, i.e., it has a large nominal offset. Similarly, when flux enhancers are used, the field modulation due to the flux enhancers has an offset because the enhancers within the transmitter winding 136 all create the same field modulation, while the space between the modulators provides no modulation. Each positive and negative polarity loop 150 and 152 of each receiver winding 140 or 142 therefore sees a spatially modulated field that varies between a minimum value and a maximums. value having the same polarity. The mean value of this function also has a large nominal offset.

A receiver winding having an equal number of similar positive and negative polarity loops 150 and 152 helps eliminate the offset components. However, any imperfection in the balance between the positive and negative polarity loops 150 and 152 allows residual offsets according to the previous description.

Both these offset components are expected to be canceled solely by the symmetry between the positive and negative polarity loops 150 and 152 in the first and second windings 140 and 142. This puts very stringent requirements on the manufacturing precision of the receiver windings 140 and 142. Experience in manufacturing a transducer indicates it is practically impossible to eliminate this source of error from the induced current position transducer of a conventional linear scale.

Furthermore, any deviations in the width or pitch of the flux modulators 108 will unbalance the receiver windings 140 or 142 in a way that is independent of the relative position between the scale 104 and the slider assembly 120.

Any signal component which is independent of the transducer position, such as the aforementioned offset components, is regarded as an extraneous signal to the operation of the transducer. Such extraneous signals complicate the required signal processing circuitry and otherwise lead to errors which compromise the accuracy of the transducer.

One proposed solution attempts to reduce the extraneous coupling between the transmitter and receiver windings simply by placing the receiver winding distant from the field produced by the transmitter winding. However, the effectiveness of this technique alone depends on the degree of separation between the transmitter and receiver windings. Hence, this technique contradicts the need for high accuracy linear scale of compact size. Alternatively, the transmitter field can be confined with magnetically permeable materials so that the effectiveness of a given degree of separation is increased. However, this technique leads to additional complexity, cost, and sensitivity to external fields, in a practical device.

Furthermore, the simple winding configurations disclosed in association with these techniques include no means for creating a device with a measuring range significantly exceeding the span of the transmitter and receiver windings. In addition, the simple winding configurations provide no means for significantly enhancing the degree of output signal change per unit of displacement for a given measuring range. Thus, the practical measuring resolution of these devices is limited for a given measuring range.

The need for a high accuracy inductive linear scale which rejects both extraneous signal components and external fields, is compact, of simple construction, and capable of high resolution measurement over an extended measuring range without requiring increased fabrication and circuit accuracies, has therefore not been met previously.

SUMMARY OF THE INVENTION

This invention provides an electronic linear scale using an induced current position transducer with improved winding configurations. The improved winding configurations increase the proportion of the useful output signal component relative to extraneous ("offset") components of the output signal without requiring increased transducer fabrication accuracy. Furthermore, the winding configurations provide means to enhance the degree of output signal change per unit of displacement for a given measuring range.

This is accomplished by winding configurations that minimize and nullify the extraneous coupling between the transmitter and receiver windings while providing enhanced position-dependent coupling between them through a plurality of coupling windings on the scale which interact with a plurality of spatial modulations of the windings.

This invention further provides an electronic linear scale using a reduced offset incremental induced current position transducer.

In particular, this invention includes an electronic linear scale using a reduced offset induced current position transducer having a scale and a read head that are movable relative to each other along a measuring axis. The read head includes a pair of receiver windings extending along the measuring axis. The read head further includes a transmitter winding extending along the measuring axis and positioned laterally from the receiver windings in a direction perpendicular to the measuring axis.

In a first embodiment of the electronic linear scale using the induced current position transducer of this invention, the transmitter winding is divided into a first transmitter loop and a second transmitter loop, with the first transmitter loop placed on one side of the receiver windings and the second transmitter loop placed on the other side of the receiver windings. The magnetic fields created by the first and second loops of the transmitter winding counteract each other in the area of the receiver winding. This minimizes the extraneous effects of any direct coupling from the transmitter winding to the receiver winding.

The scale member has a plurality of first coupling loops extending along the measuring axis and interleaved with a plurality of second coupling loops also extending along the measuring axis. The first coupling loops have a first portion aligned with the first transmitter winding and a second portion aligned with the receiver windings. Similarly, the second coupling loops have a first portion aligned with the second winding loop and a second portion aligned with the receiver windings.

In a second embodiment of the induced current position transducer of this invention, the transmitter has only one loop, which is placed alongside the receiver windings on the read head. The scale member in this case has a plurality of first coupling loops arrayed along the measuring axis and interleaved with a second plurality of coupling loops also arrayed along the measuring axis. Both the first and second coupling loops have a first portion aligned with the transmitter winding and a second portion aligned with the receiver windings.

The first and second portions of each first coupling loop are connected in series and are "untwisted". Thus, the magnetic fields induced in the first and second portions of the first coupling loops have the same polarity. In contrast, the first and second portion of each second coupling loop are connected in series and are "twisted". In this case, the magnetic fields induced in the first and second portions of the second coupling loops have opposite polarities. This creates an alternating induced magnetic field along the measuring axis in the area under the receiver winding in response to exciting the transmitter winding.

These winding configurations substantially eliminate several extraneous signal components, resulting in simplified signal processing and improved transducer accuracy and robustness in an economical design.

This invention provides an improved electronic linear scale that uses an induced current position transducer with improved winding configurations. This invention uses a transducer with example embodiments that are described in copending U.S. patent application Ser. No. 08/834,432, filed on Apr. 16, 1997, entitled "REDUCED OFFSET HIGH ACCURACY INDUCED CURRENT POSITION TRANSDUCER" which is hereby incorporated by reference in its entirety.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein:

FIG. 13A shows a third preferred embodiment of the scale for the reduced offset induced current position transducer of this invention;

FIG. 13B shows a first portion of the scale of FIG. 13A in greater detail;

DETAILED DESCRIPTION OF PREFERRED EMBODIMENTS

Figure 5:
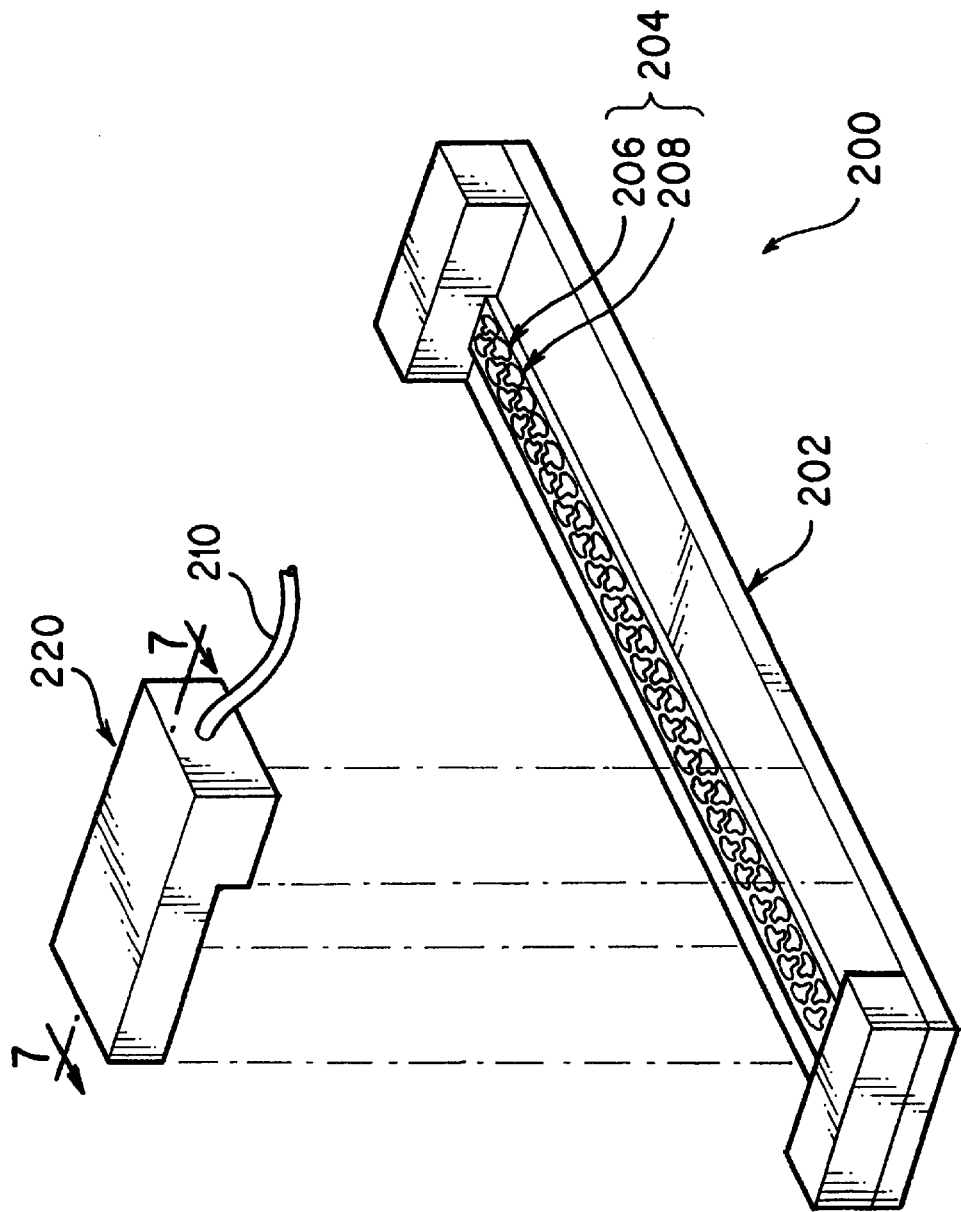
FIG. 5 is an isometric view of an electronic linear scale which contains a reduced offset high accuracy induced current position transducer.

As shown in FIG. 5, an inductive linear scale 200 includes an elongated beam 202 and a slider assembly 220. The beam 202 is a rigid or a semi-rigid bar having a generally rectangular cross-section.

During operation, the slider assembly 220 is installed in close proximity to scale 204 without contacting any components on the beam 202 itself. Both the beam 202 and the slider assembly 220 may be affixed to other objects in a variety of configurations. In this manner, the linear scale 200 measures the relative position of the slider assembly 220 relative to the beam 202, thereby also measuring the relative position between any mechanical fixtures to which these two components are attached.

Alternately, the scale 204 may be fabricated of a flexible or rigid dimensionally stable material. The scale 204 can be applied directly to a mechanical fixture with clamps or adhesive, thus eliminating the beam 202. The scale 204, but not the beam 202, is preferably non-conductive, and necessarily insulated from the coupling loops 208 if the scale is conductive. The slider assembly 220 inductively monitors its own position relative to the scale 204.

The scale 204 is preferably an elongated printed circuit board 206. As shown in FIG. 5, a set of coupling loops 208 are placed apart along the printed circuit board 206 in a periodic pattern. A display cable 210 is also shown in FIG. 5.

Figure 6:
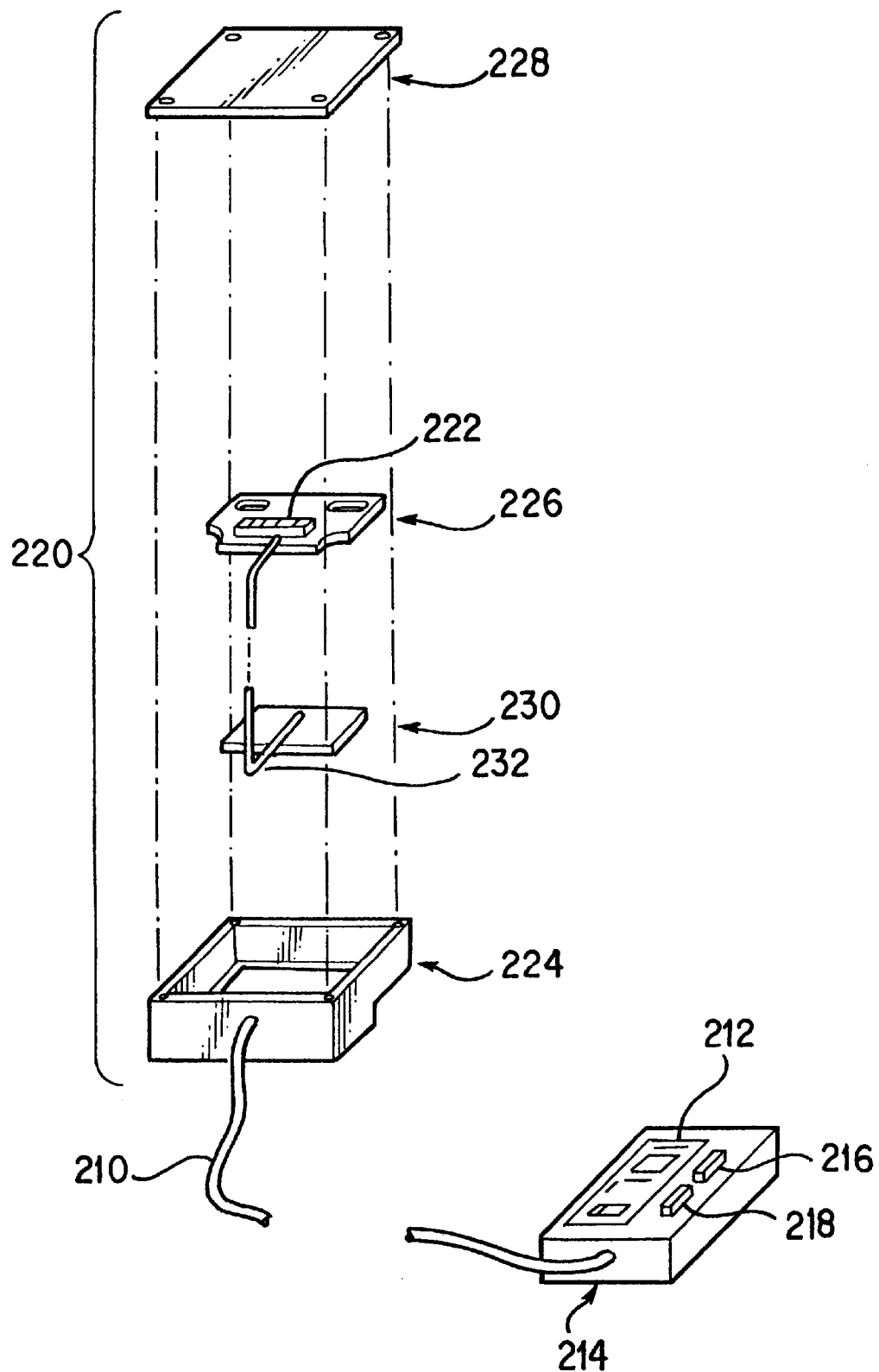
FIG. 6 is an exploded view of the slider of the linear scale of FIG. 5 and an associated digital display unit.

As shown in FIG. 6, the measurement generated by the linear scale is displayed on a conventional digital display 212 mounted on the digital display unit 214. A pair of push button switches 216 and 218 are also mounted on the digital display unit 214. The switch 216 turns on and off the signal processing electronics 222 and the digital display unit 214. The switch 218 resets the origin of the linear scale to the current position of the slide assembly 220 relative to the scale 204. Alternately, the position information from the slider assembly 220 may be routed to other types of electronic control systems or displays. The slider assembly 220 includes a slider housing 224 which preferably holds the read head 230 in close proximity to the beam 202 without making contact with the beam 202.

The slider assembly 220 also includes a substrate 226, such as a conventional printed circuit board. The signal processing electronics 222 are preferably mounted on an upper surface of the substrate 226, although a portion of the signal processing electronics may be placed on the interior side of the read head 230, as an alternative (not shown). The contents of the slider housing 224 are protected by a cover 228. A ribbon-like read head connector 232 electronically connects the read head 230 to the signal processing electronics 222. The display cable 210 is attached to signal processing electronics 222 inside the housing 224, by conventional means.

Figure 7:
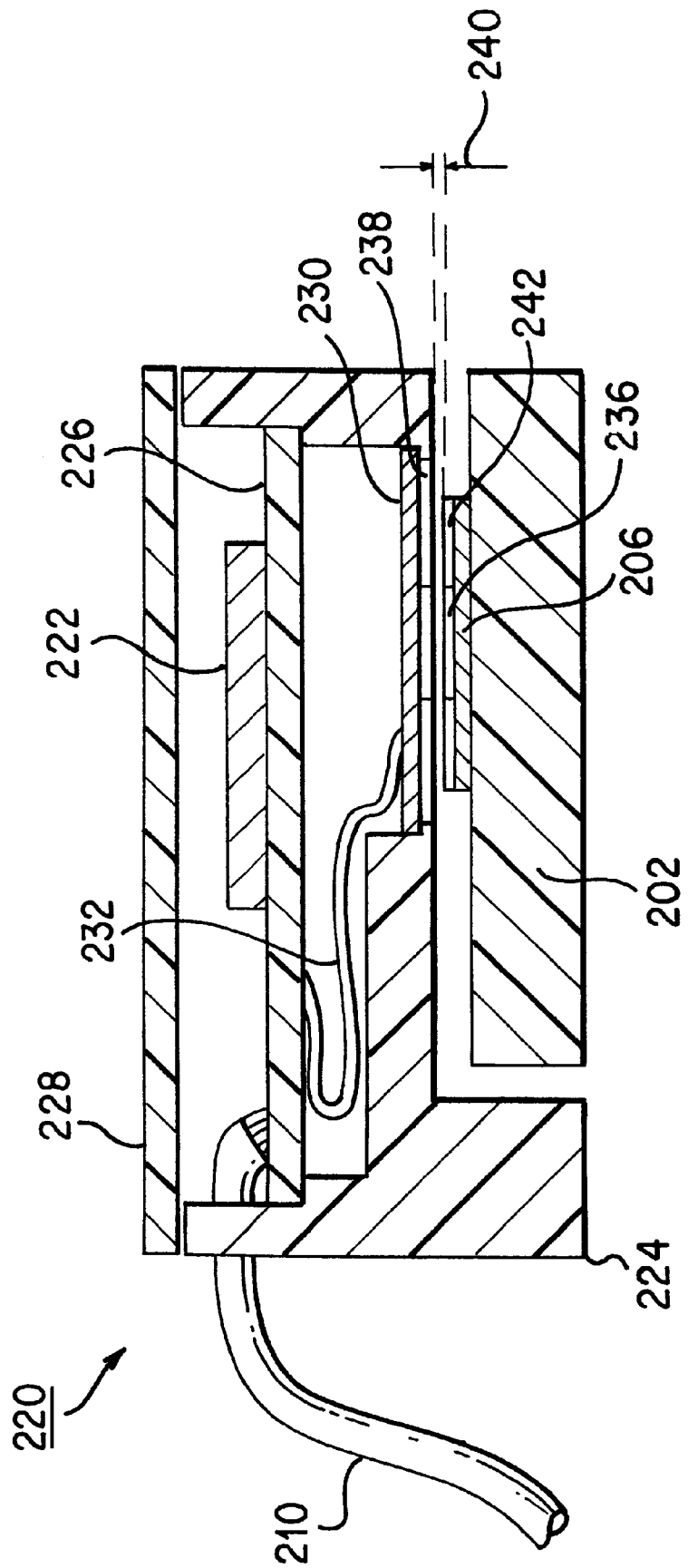
FIG. 7 is a cross-sectional view of the slider and the beam of the linear scale taken along line 7—7 of FIG. 5.

As shown in FIG. 7, the read head 230 is covered by a thin durable insulative coating 238. The insulative coating 238 is preferably approximately 50 micrometers thick. Alternatively, the insulative coating 238 may be replaced by a membrane sealing the entire scale-facing surface of the slider housing 224. All external joints of the slider assembly 220 are sealed with adhesives (not shown) or other conventional means to prevent contaminants from contacting the electronic circuits.

The slider assembly 220 carries the read head 230 so that it is slightly separated from the beam 202 by an air gap 240 formed between the insulative coatings 238 and 242. The air gap 240 is preferably on the order of 0.4 millimeters. Together, the read head 238 and the coupling loops 236 form an inductive transducer.

Power may be supplied to either the slider assembly 220 or the digital display unit 214 by conventional means (not shown) and routed through the display cable 210. Either battery power, power from solar cells, or conventional external power may be used.

Figure 8:
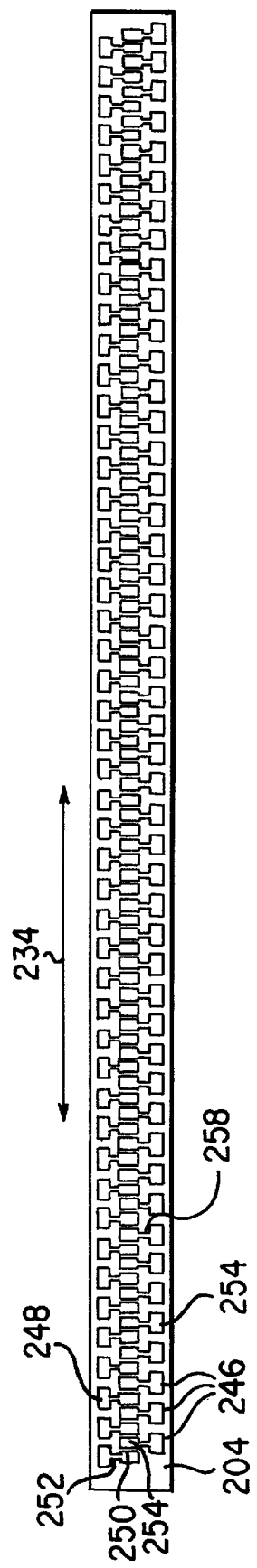
FIG. 8 shows a first preferred embodiment of the scale for the reduced offset induced current position transducer for the electronic linear scale of this invention.
Figure 9:
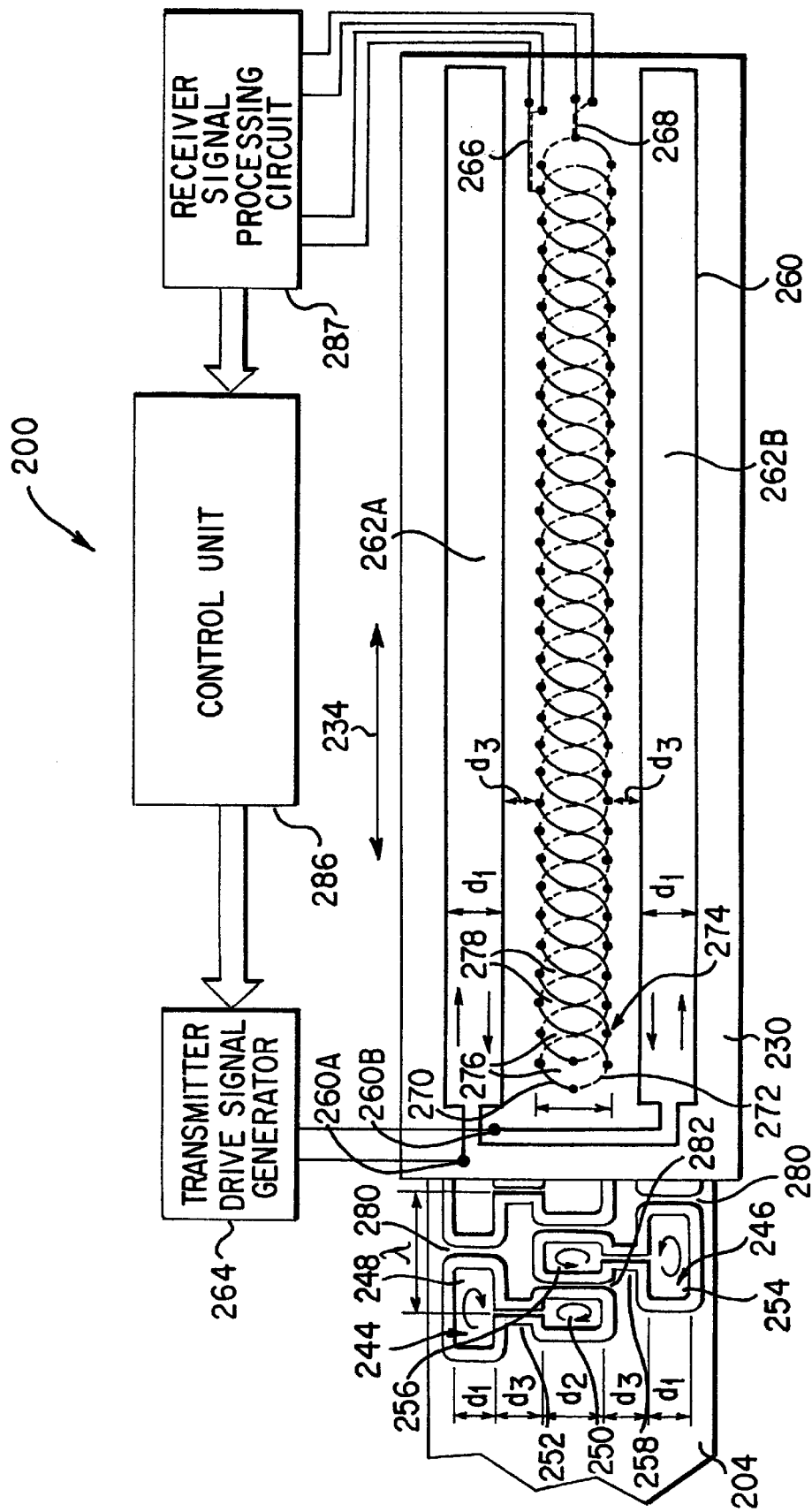
FIG. 9 shows a first preferred embodiment of the reduced offset high accuracy induced current position transducer of the electronic linear scale of this invention.

FIGS. 8 and 9 show a first preferred embodiment of the reduced-offset induced current position transducer 200 used in the electronic linear scale of this invention, which produces an output type usually referred to as "incremental". "Incremental" means the transducer produces a cyclic output which is repeated according to a design-related increment of transducer displacement.

In particular, FIG. 8 shows a first preferred embodiment of the reduced offset scale 204 of the transducer 200. As shown in FIG. 8, the reduced-offset scale 204 includes a first plurality of closed-loop coupling loops 244 interleaved with a second plurality of closed-loop coupling loops 246. Each of the coupling loops 244 and 246 is electrically isolated from the others of the first and second plurality of coupling loops 244 and 246.

Each of the first plurality of coupling loops 244 includes a first loop portion 248 and a second loop portion 250 connected by a pair of connecting conductors 252. Similarly, each of the second plurality of coupling loops 246 includes a first loop portion 254 and a second loop portion 256 connected by a pair of connecting conductors 258.

In the first plurality of coupling loops 244, the first loop portions 248 are arranged along one lateral edge of the scale 204 and are arrayed along a measuring axis 234. The second loop portions 250 are arranged along the center of the scale 204 and are arrayed along the measuring axis 234. The connecting conductors 252 extend perpendicularly to the measuring axis 234 to connect the first loop portions 248 to the second loop portions 250.

Similarly, in the second plurality of coupling loops 246, the first loop portions 254 are arranged along a second lateral edge of the scale 204 and arrayed along the measuring axis 234. The second loop portions 256 are arranged along the center of the scale 204 along the measuring axis 234, interleaved with the second loop portions 250 of coupling loops 246. The connecting conductors 258 extend generally perpendicularly to the measuring axis 234 to connect the first loop portions 254 to the second loop portions 256.

As shown in FIG. 9, the read head 230 of the transducer 200 includes a transmitter winding 260 having a first transmitter winding portion 262A and a second transmitter winding portion 262B. As shown in FIG. 9, the first transmitter winding portion 262A is provided at a first lateral edge of the read head 230 while the second transmitter winding portion 262B is provided at the other lateral edge of the read head 230. Each of the first and second transmitter winding portions 262A and 262B have the same long dimension extending along the measuring axis 234. Furthermore, each of the first and second transmitter winding portions 262A and 262B have a short dimension that extends a distance $d_1$ in a direction perpendicular to the measuring axis 234.

The terminals 260A and 260B of the transmitter winding 260 are connected to the transmitter drive signal generator 264. The transmitter drive signal generator 264 outputs a time-varying drive signal to the transmitter winding terminal 262A. Thus a time-varying current flows through the transmitter winding 260 from the transmitter winding terminal 260A to the transmitter terminal 260B, as indicated in FIG. 9.

In response, the first transmitter winding portion 262A generates a primary magnetic field that rises up out of the plane of FIG. 9 inside the first transmitter winding portion 262A and descends into the plane of FIG. 9 outside the loop formed by the first transmitter winding portion 262A. In contrast, the second transmitter winding portion 262B generates a primary magnetic field that rises up out of the plane of FIG. 9 outside the loop formed by the second transmitter winding portion 262B and descends into the plane of FIG. 9 inside the loop formed by the second transmitter winding portion 262B.

In response, a current is induced in the coupling loops 244 and 246 that counteracts the change of magnetic field. Thus, the induced current in each of the coupling loop sections 248 and 254 flows in a direction opposite to the current flowing in the respective adjacent portions of the transmitter loops 262A and 262B. As shown in FIG. 9 adjacent ones of the second loop portions 250 and 256 in the center section of the scale have loop currents having opposite polarities. Thus, a secondary magnetic field is created having field portions of opposite polarity periodically distributed along the center section of the scale. The wavelength λ of the periodic secondary magnetic field is equal to the distance between successive second loop portions 250 (or 256).

Figure 1:
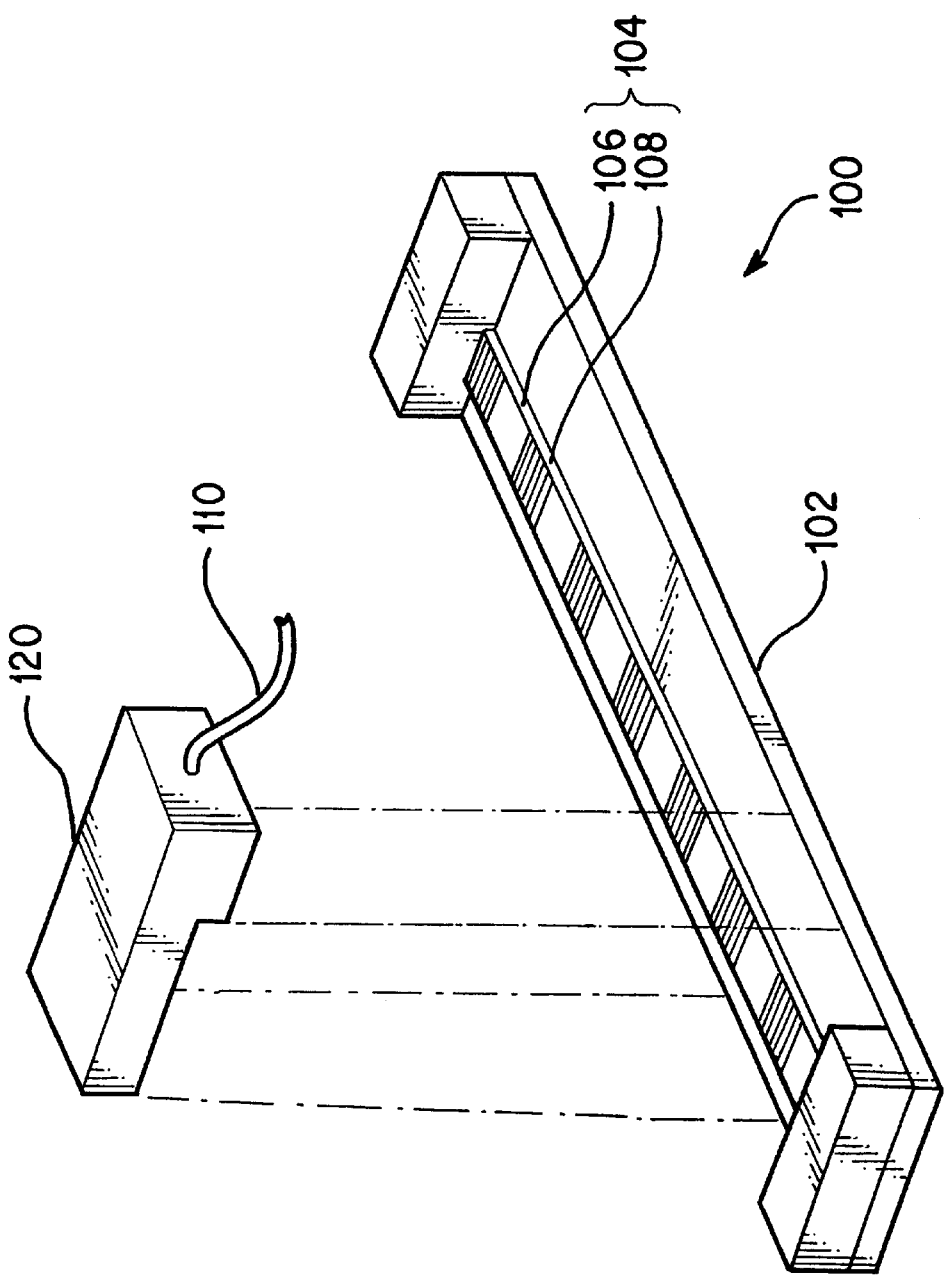
FIG. 1 shows a known electronic linear scale with an induced current position transducer having undesirable extraneous signal offset components.
Figure 2:
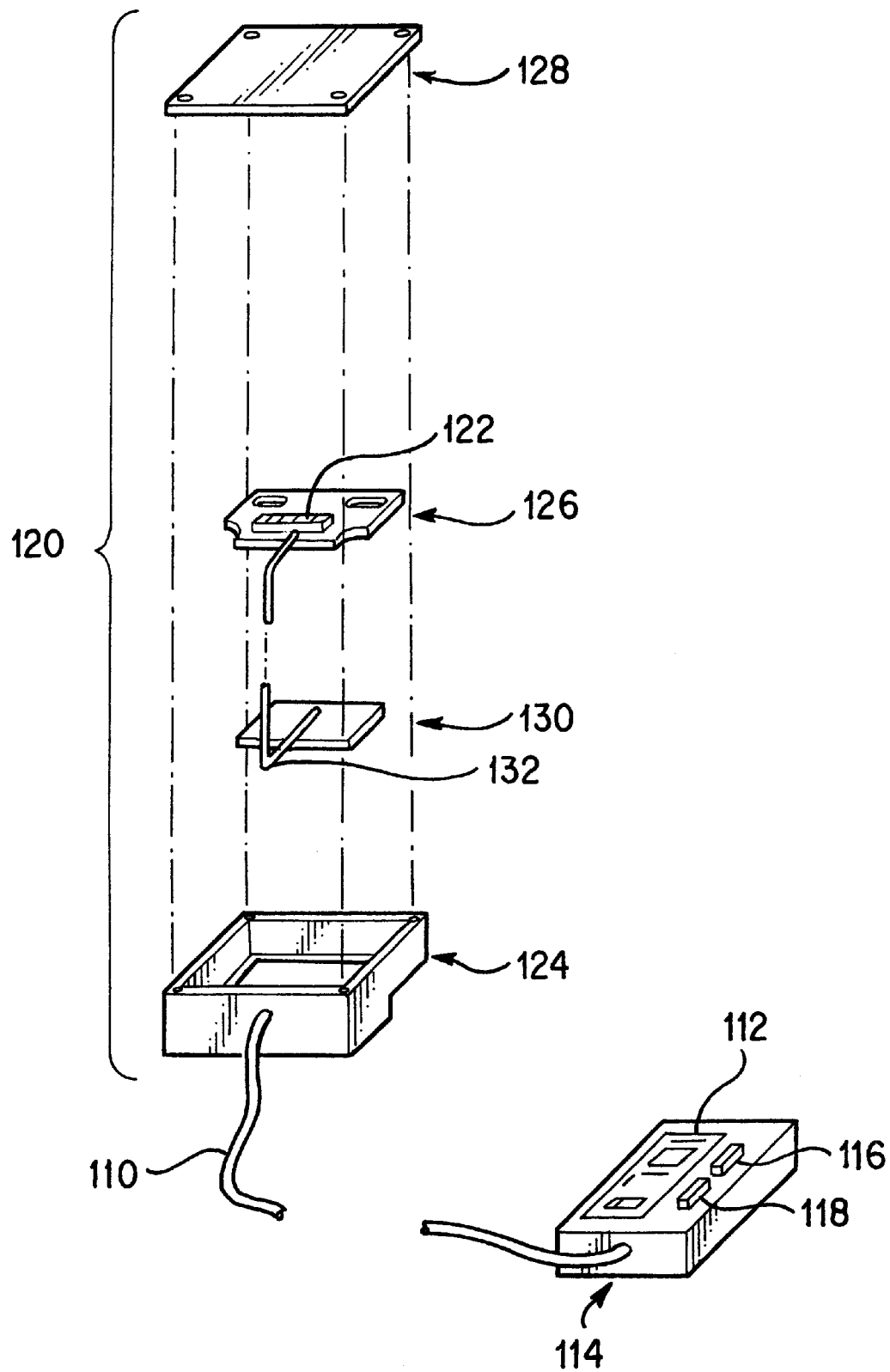
FIG. 2 is an exploded view of the slider of the linear scale of FIG. 1 and an associated digital display unit.
Figure 3:
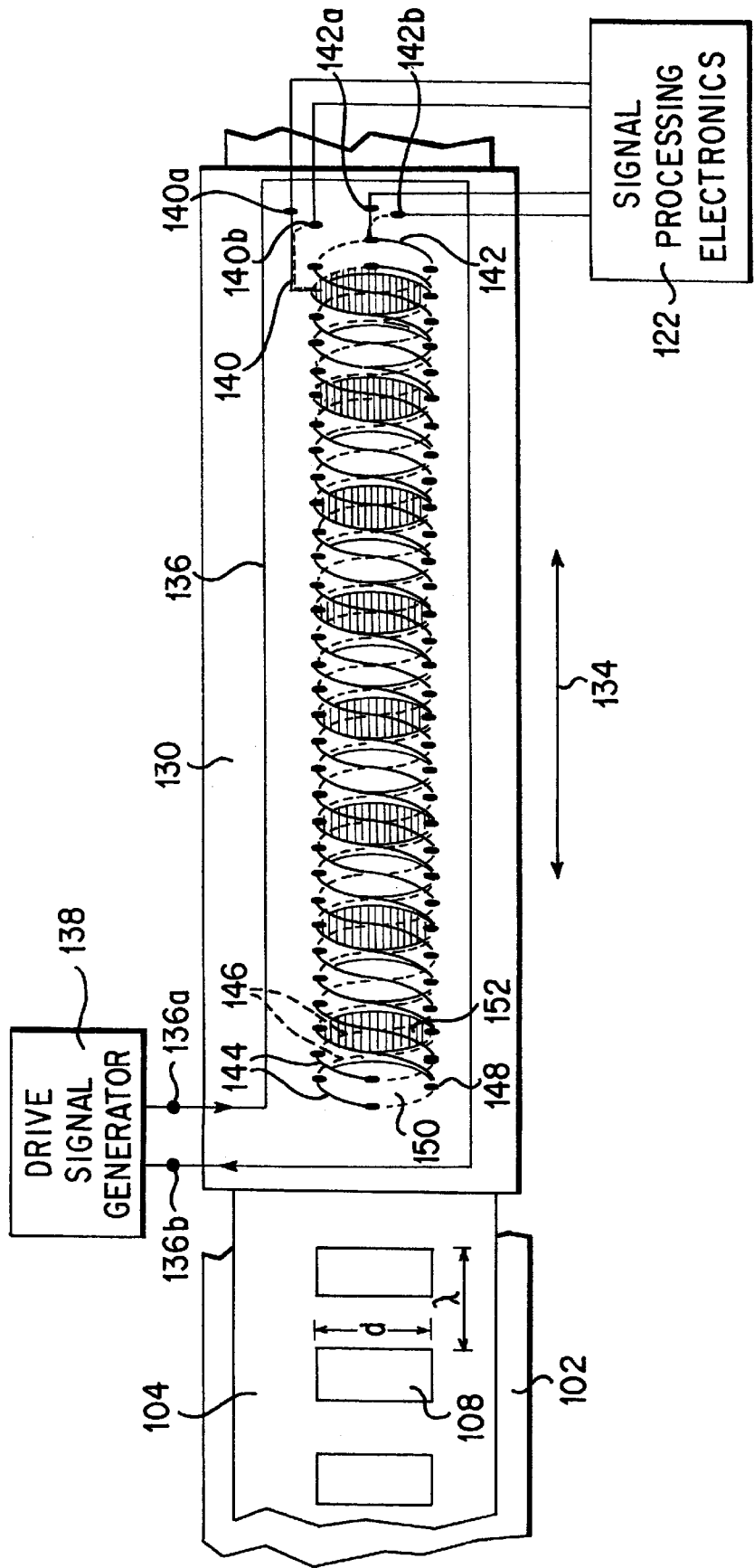
FIG. 3 shows the induced current position transducer having undesirable extraneous signal offset components of the electronic linear scale of FIG. 1.

The read head 230 also includes first and second receiver windings 266 and 268 that are generally identical to the first and second receiver windings 240 and 242 shown in FIG. 3. In particular, similarly to the first and second receiver windings 140 and 142 shown in FIG. 3, the first and second receiver windings 266 and 268 are each formed by a plurality of sinusoidally-shaped loop segments 270 and 272 formed on opposite sides of an insulating layer of the printed circuit board forming the read head 230.

The loop segments 270 and 272 are linked through feed-throughs 274 to form alternating positive polarity loops 276 and negative polarity loops 278 in each of the first and second receiver windings 266 and 268. The receiver windings 266 and 268 are positioned in the center of the read head 230 between the first and second transmitter portions 262A and 262B. Each of the first and second receiving windings 266 and 268 extends a distance $d_2$ in the direction perpendicular to the measuring axis.

Extraneous (position independent and scale independent) coupling from the transmitter loops to the receiver loops is generally avoided in this configuration. That is, the primary magnetic fields generated by the first and second transmitter portions 262A and 262B point in opposite directions in the vicinity of the first and second receiver windings 266 and 268. Thus, the primary magnetic fields counteract each other in the area occupied by the first and second receiver windings 266 and 268. Ideally, the primary magnetic fields completely counteract each other in this area. The first and second receiver windings 266 and 268 are spaced equal distances $d_3$ from the inner portions of the first and second transmitter winding portions 262A and 262B. Thus, the magnetic fields generated by each of the first and second transmitter winding portions 262A and 262B in the portion of the read head 230 occupied by the first and second receiver windings 266 and 268 are in symmetric opposition. Thus, the associated inductive effects effectively cancel each other out. The net voltage induced in the first and second receiver windings 266 and 268 by extraneous direct coupling to the first and second transmitter winding portions 262A and 262B is reduced to a first extent by positioning the transmitter windings away from the receiver windings. Secondly, the symmetric design effectively reduces the net extraneous coupling to zero.

Each of the first plurality of coupling loops 244 is arranged at a pitch equal to a wavelength λ of the first and second receiver windings 266 and 268. Furthermore, the first loop portions 248 each extends a distance along the measuring axis 234 which is as close as possible to the wavelength λ while still providing an insulating space 280 between adjacent ones of the first loop portions 248. In addition, the first loop portions 248 extend the distance $d_1$ in the direction perpendicular to the measuring axis 234.

Similarly, each of the second plurality of coupling loops 246 is also arranged at a pitch equal to the wavelength λ. The first loop portions 254 also extend as close as possible to each other along the measuring axis to the wavelength λ while providing the space 280 between adjacent ones of the first loop portions 254. The first loop portions 254 also extend the distance $d_1$ in the direction perpendicular to the measuring axis 234.

The second loop portions 250 and 256 of the first and second pluralities of coupling loops 244 and 246 are also arranged at a pitch equal to the wavelength λ. However, each of the second loop portions 250 and 256 extends along the measuring axis as close as possible to only one-half the wavelength λ. An insulating space 282 is provided between each adjacent pair of second loop portions 250 and 256 of the first and second pluralities of coupling loops 244 and 246, as shown in FIG. 9. Thus, the second loop portions 250 and 256 of the first and second pluralities of coupling loops 244 and 246 are interleaved along the length of the scale 204. Finally, each of the second loop portions 250 and 256 extends the distance $d_2$ in the direction perpendicular to the measuring axis 234.

As shown in FIG. 9, the second loop portions 250 and 256 are spaced the distance $d_3$ from the corresponding first loop portions 248 and 254. Accordingly, when the read head 230 is placed in proximity to the scale 204, as shown in FIG. 9, the first transmitter winding portion 262A aligns with the first loop portions 248 of the first plurality of coupling loops 244. Similarly, the second transmitter winding portion 262B aligns with the first loop portions 254 of the second plurality of coupling loops 246. Finally, the first and second receiver windings 266 and 268 align with the second loop portions 250 and 256 of the first and second coupling loops 244 and 246. As will be apparent from the preceding and the following discussions, the area enclosed by the second loop portions 250 and 256 defines a sensing track extending parallel to the measuring axis, and substantially all of the effective magnetic field passing through the sensing track is due solely to the current flow in the second loop portions.

In operation, a time-varying drive signal is output by the transmitter drive signal generator 264 to the transmitter winding terminal 260A. Thus, the first transmitter winding portion 262A generates a first changing magnetic field having a first direction while the second transmitter winding portion 262B generates a second magnetic field in a second direction that is opposite to the first direction. This second magnetic field has a field strength that is equal to a field strength of the first magnetic field generated by the first transmitter winding portion 262A.

Each of the first plurality of coupling loops 244 is inductively coupled to the first transmitter winding portion 262A by the first magnetic field generated by the first transmitter winding portion 262A. Thus, an induced current flows clockwise through each of the first plurality of coupling loops 244. At the same time the second plurality of coupling loops 246 is inductively coupled to the second transmitter winding portion 262B by the second magnetic field generated by the second transmitter winding portion 262B. This induces a counterclockwise current to flow in each of the second plurality of coupling loops 246. That is, the currents through the second portions 250 and 256 of the coupling loops 244 and 246 flow in opposite directions.

The clockwise flowing current in each of the second portions 250 of the first coupling loops 244 generates a third magnetic field that descends into the plane of FIG. 9 within the second portions 250. In contrast, the counterclockwise flowing currents in the second loop portions 256 of the second coupling loops 246 generate a fourth magnetic field that rises out of the plane of FIG. 9 within the second loop portions 256 of the second coupling loops 246. Thus, a net alternating magnetic field is formed along the measuring axis 234. This net alternating magnetic field has a wavelength which is equal to the wavelength λ of the first and second receiver windings 266 and 268.

Accordingly, when the positive polarity loops 276 of the first receiver winding 266 are aligned with either the second loop portions 250 or 256, the negative polarity loops 278 of the first receiver winding 266 are aligned with the other of the second loop portions 250 or 256. This is also true when the positive polarity loops 276 and the negative polarity loops 278 of the second receiver winding 268 are aligned with the second loop portions 250 and 256. Because the alternating magnetic field generated by the second loop portions 250 and 256 is spatially modulated at the same wavelength as the spatial modulation of the first and second receiver windings 266 and 268, the EMF generated in each of the positive and negative polarity loops 276 and 278 when aligned with the second loop portions 250 is equal and opposite to the EMF generated when they are aligned with the second loop portions 256.

Figure 4A:
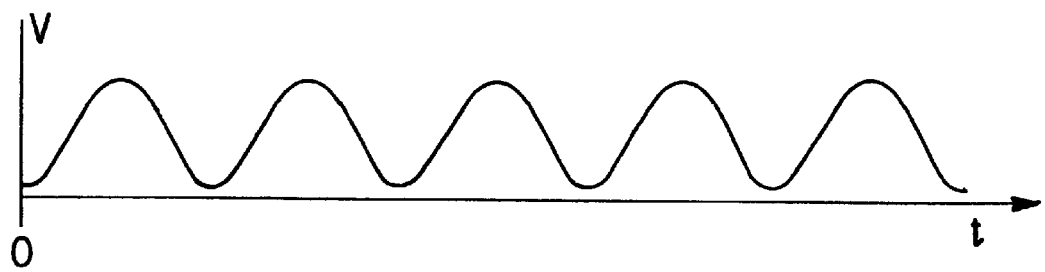
FIG. 4A shows the position-dependent output of the positive polarity loops of FIG. 3.
Figure 4B:
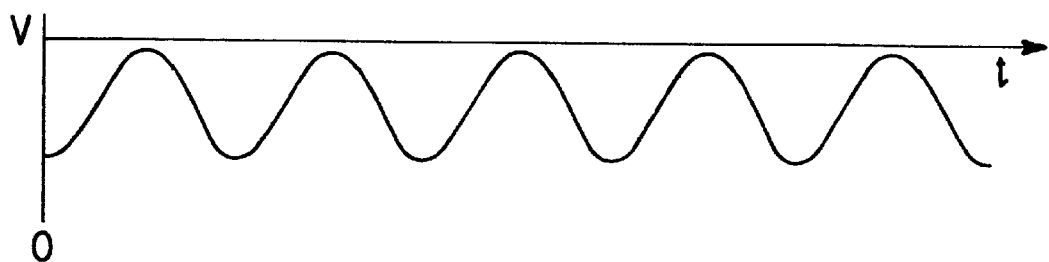
FIG. 4B shows the position-dependent output of the negative polarity loops of FIG. 3.
Figure 4C:
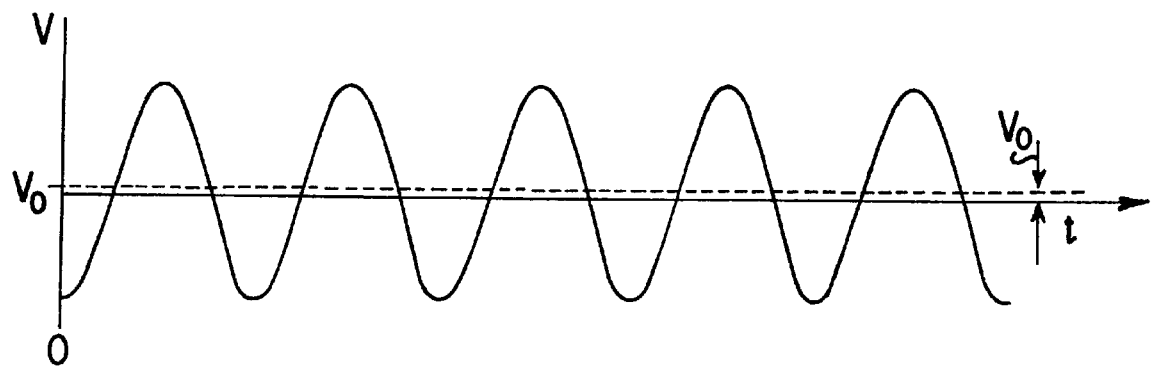
FIG. 4C shows the net position-dependent output of the positive and negative polarity loops of FIG. 3.

Thus, the net output of the positive polarity loops 276, as the read head 230 moves relative to the scale 204 is a sinusoidal function of the relative position "x" of the read-head along the scale and the offset component of the output signal due to extraneous coupling is nominally zero. Similarly, the net output from the negative polarity loops 278, as the read head 230 moves relative to the scale 204, it is also sinusoidal and centered on the position axis. The EMF output from the positive polarity loops 276 and the negative polarity loops 278 are in phase. They thus generate a net position-dependent output signal corresponding to FIG. 4C, but without the DC bias $V_o$.

Finally the first and second receiver windings 266 and 268, like the first and second receiver windings 140 and 142, are in quadrature. Thus, the output signal generated by the first receiver winding 266 as a function of x and output to the receiver signal processing circuit 284 is 90 degrees out of phase with the signal output by the second receiver winding 268 as a function of x to the receiver signal processing circuit 284.

The receiver signal processing circuit 284 inputs and samples the output signals from the first and second receiver windings 266 and 268, converts the signals to digital values and outputs them to the control unit 286. The control unit 286 processes these digitized output signals to determine the relative position x between the read head 230 and the scale 204 within a wavelength $\lambda$.

It should be appreciated that, with a suitable feed-through arrangement, either the positive polarity loops 276 or the negative polarity loops 278 could be reduced to zero width perpendicular to the measuring axis (becoming effectively simple conducting elements between the adjacent loops). In this case, the first and second receiver windings 266 and 268 become unipolar flux receivers, introducing an increased sensitivity to external fields, and reducing their output signal amplitude to half that of the previously described embodiment (due to the eliminated loop area).

However, the modified design retains many inventive benefits. The net extraneous flux through the loops is still nominally zero due to the symmetric transmitter winding configuration. The output signal from each receiver winding 266 and 268 still swings from a maximum positive value to a maximum negative value with nominally zero offset. The degree of output signal change per unit of displacement, for a given measuring range, is still very high, due to the complementary periodic structure of the scale elements and receiver windings.

Based on the nature of the quadrature output from the first and second receiver windings 266 and 268, the control unit 286 is able to determine the direction of relative motion between the read head 230 and the scale 204. The control unit 286 counts the number of partial or full "incremental" wavelengths $\lambda$ traversed, by signal processing methods well-known to those skilled in the art and disclosed herein and in the incorporated references. The control unit 286 uses that number and the relative position within a wavelength $\lambda$ to output the relative position between the read head 230 and the scale 204 from a set origin.

The control unit 286 also outputs control signals to the transmitter drive signal generator 264 to generate the time-varying transmitter drive signal. It should be appreciated that any of the signal generating and processing circuits shown in U.S. patent application Ser. No. 08/441,769, filed May 16, 1995, U.S. patent application Ser. No. 08/645,483, filed May 13, 1996 and U.S. patent application Ser. No. 08/788,469, filed Jan. 29, 1997 hereby incorporated by reference, can be used to implement the receiver signal processing circuit 284, the transmitter drive signal generator 264 and the control unit 286. Thus, these circuits will not be described in further detail herein.

Figure 10:
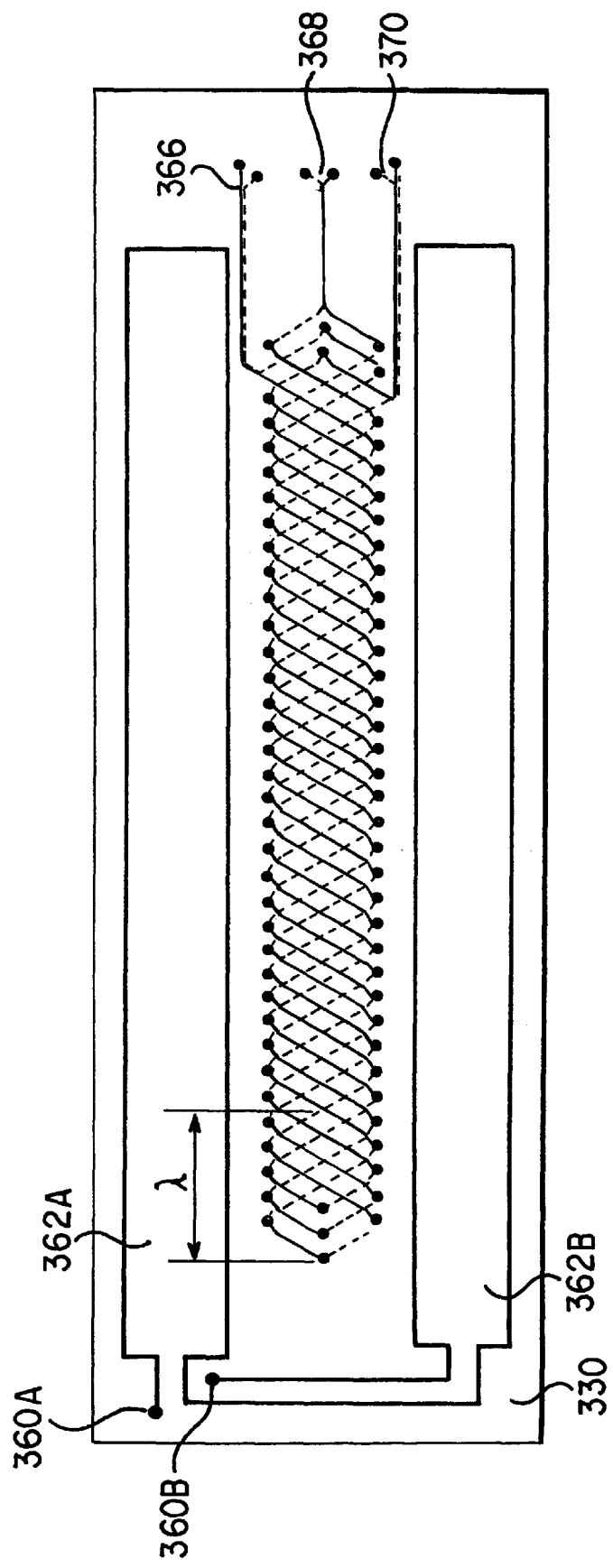
FIG. 10 shows a second preferred embodiment of the read-head for the reduced offset induced current position transducer of this invention.
Figure 11:
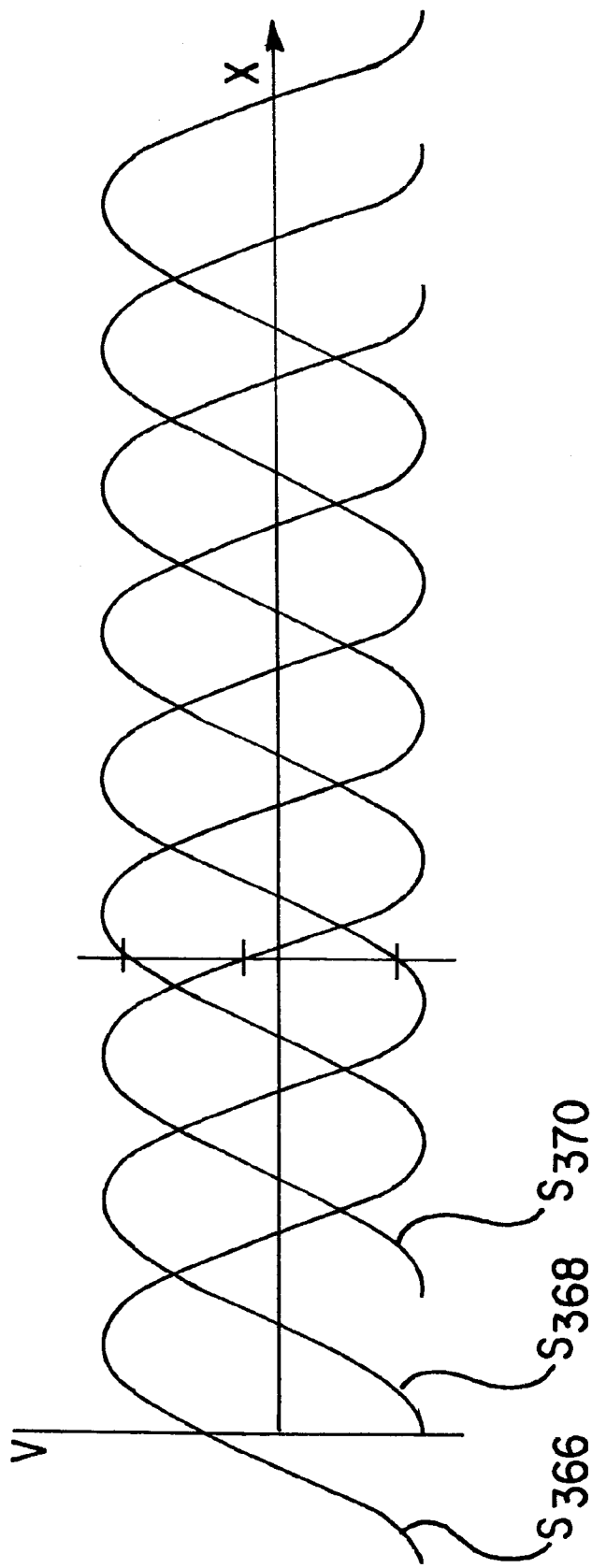
FIG. 11 shows the signal amplitudes as a function of the relative position of the scale and read-head of FIG. 10.

FIG. 10 shows a second preferred embodiment of a read-head that can be used with a scale according to FIG. 8. The receiver in this version of the read-head has three receiver windings 366, 368 and 370. The receiver windings are offset from each other along the measurement axis by ⅓ of the wavelength $\lambda$. FIG. 11 shows the signal functions from the three receivers as a function of the position x along the measurement axis.

It should be appreciated that perfectly sinusoidal output functions are difficult to achieve in practice, and that deviations from a perfect sinusoidal output contain spatial harmonics of the fundamental wavelength of the transducer. Therefore, the three phase configuration of this second preferred embodiment of the reduced-offset induced current position transducer has a significant advantage over the first preferred embodiment of the reduced offset induced current position transducer, in that the third harmonic content in the separate receiver windings' signal function of x can be largely eliminated as a source of position measurement error.

Figure 12:
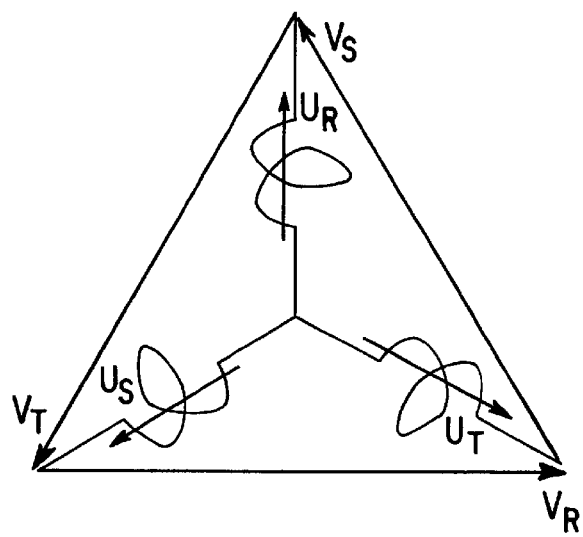
FIG. 12 shows a schematic vector phase diagram for the three phase windings of FIG. 10.

Eliminating the third harmonic is accomplished by combining the outputs of the receiver windings as shown in FIG. 12, where the three windings are connected in a star configuration and the signals used for determining position are taken between the corners of the star. This can also be accomplished by measuring each of the output signals independently from the receiver windings 366, 368 and 370, and then combining them computationally in a corresponding way in a digital signal processing circuit. The following equations outline how the third harmonic component is eliminated by suitably combining the original three phase signals, designated as $U_R$, $U_S$, and $U_T$.

Assume each of the unprocessed phase signals contains the fundamental sinusoidal signal plus the third harmonic signal, with equal amplitude in the three phases, then:

$$U_R = A_0 \sin\left(2\pi\frac{x}{\lambda}\right) + A_3 \sin\left(2\pi\frac{3x}{\lambda}\right)$$

$$U_S = A_0 \cdot \sin\left(2\pi\frac{x+\frac{\lambda}{3}}{\lambda}\right) + A_3 \sin\left(2\pi\frac{3\left(x+\frac{\lambda}{3}\right)}{\lambda}\right)$$

$$= A_0 \cdot \sin\left(2\pi\frac{x}{\lambda} + \frac{2\pi}{3}\right) + A_3 \sin\left(2\pi 3\frac{x}{\lambda} + 2\pi\right)$$

$$= A_0 \cdot \sin\left(2\pi\frac{x}{\lambda} + \frac{2\pi}{3}\right) + A_3 \sin\left(2\pi 3\frac{x}{\lambda}\right);$$

-continued $$U_T = A_0 \cdot \sin\left(2\pi x - \frac{\frac{\lambda}{3}}{\lambda}\right) + A_3 \sin\left(2\pi \frac{3\left(x - \frac{\lambda}{3}\right)}{\lambda}\right)$$

$$= A_0 \cdot \sin\left(2\pi \frac{x}{\lambda} - \frac{2\pi}{3}\right) + A_3 \sin\left(2\pi \frac{3x}{\lambda} - 2\pi\right)$$

$$= A_0 \cdot \sin\left(2\pi \frac{x}{\lambda} - \frac{2\pi}{3}\right) + A_3 \sin\left(2\pi \frac{3x}{\lambda}\right)$$

Creating new signals by pair-wise subtracting the above-outlined signals from each other eliminates the third harmonic to provide:

$$V_R = U_T - U_S = A_0\left(\sin\left(2\pi\frac{x}{\lambda} - \frac{2\pi}{s}\right) - \sin\left(2\pi\frac{x}{\lambda} + \frac{2\pi}{3}\right)\right) = -A_0\sqrt{3}\cos 2\pi\frac{x}{\lambda}$$

$$V_S = U_R - U_T = A_0\left(\sin\left(2\pi\frac{x}{\lambda}\right) - \sin\left(2\pi\frac{x}{\lambda} - \frac{2\pi}{3}\right)\right) = A_0\sqrt{3}\cos\left(2\pi\frac{x}{\lambda} - \frac{2\pi}{6}\right)$$

$$V_T = U_S - U_R = A_0\left(\sin\left(2\pi\frac{x}{\lambda} + \frac{2\pi}{3}\right) - \sin\left(2\pi\frac{x}{\lambda}\right)\right) = A_0\sqrt{3}\cos\left(2\pi\frac{x}{\lambda} + \frac{2\pi}{6}\right)$$

To get quadrature signals for position calculation in the same way, $V_S$ and $V_T$ are combined:

$$V_Q = V_S - V_T = A_0\sqrt{3}\left(\cos\left(2\pi\frac{x}{\lambda} - \frac{2\pi}{6}\right) - \cos\left(2\pi\frac{x}{\lambda} + \frac{2\pi}{6}\right)\right)$$

$$= A_0\sqrt{3} * 2\sin 2\pi\frac{x}{\lambda}\sin\left(-\frac{2\pi}{6}\right) = A_0 3\sin 2\pi\frac{x}{\lambda}$$

After identifying the applicable quarter-wavelength position quadrant within the incremental wavelength, the interpolated position within the quarter wavelength is then calculated by:

$$\frac{V_Q}{-V_R} = \sqrt{3} * \tan\left(2\pi\frac{x}{\lambda}\right)$$

Solving for x:

$$x = \frac{\lambda}{2\pi} * \tan^{-1}\left(\frac{V_Q}{-V_R * \sqrt{3}}\right)$$

The position calculated this way using the output from three phase receiver windings will not contain any error from third harmonic components in the receiver output signal functions, to the extent that the outputs from all three receiver windings have the same third harmonic characteristics, which is generally the case for practical devices. Also, if the receiver signals are amplified in preamplifiers in the electronic unit, the measurement error caused by certain distortion errors in those electronic preamplifiers will be canceled by the above described signal processing in the three phase configuration.

FIGS. 13A–13D show a third preferred embodiment of the read-head and scale for the reduced offset induced current position transducer of the linear scale of this invention. This embodiment contains only one transmitter winding loop 460, which is placed on one side of the receiver windings 466 and 468 on the read-head 430. The scale 404 is a two layer printed circuit board (PCB). Pattern forming coupling loops 444 and 446 are arrayed on the scale 404 along the measurement axis.

Each coupling loop 444 includes a first loop portion 448 which is connected by connection lines 452 to a second loop portion 450. The first and second loop portions 448 and 450 are connected so that an induced current produces the same polarity field in the first loop portion 448 and the second loop portion 450. Each coupling loop 446 includes a first loop portion 454 which is connected by connection lines 458 to a second loop portion 456. The first and second loop portions 454 and 456 are connected so that an induced current produces fields having opposite polarities in the first and second loop portions 454 and 456.

Figure 13C:
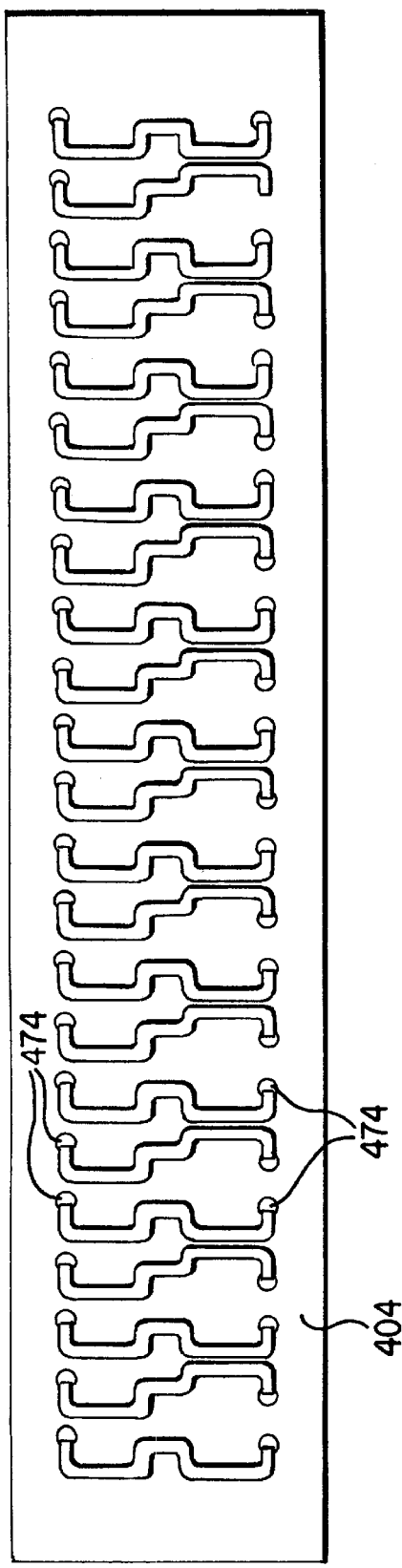
FIG. 13C shows a second portion of the scale of FIG. 13A in greater detail.

The detailed construction of the coupling loops 444 and 446 is shown in FIGS. 13B and 13C. FIG. 13B shows a first conductor pattern provided on a first one of the layers of the PCB forming the scale 404. FIG. 13C shows a second construction pattern provided on a second one of the layers of the PCB forming the scale 404. The individual portions of the first and second patterns formed on the first and second layers are connected via the feed-throughs 474 of the PCB to form the coupling loops 444 and 446.

The read head 430 is formed by a second PCB and includes a transmitter loop 460 and first and second receiver windings 466 and 468. The first and second receiver windings 466 and 468 are in this embodiment in a two-phase configuration. This embodiment could also use the three-phase configuration previously disclosed. The transmitter loop 460 encloses an area that covers the first loop portions 448 and 454 over the length of the read head. The transmitter loop 460 is excited in the same way as described previously in conjunction with FIG. 9.

Figure 13D:
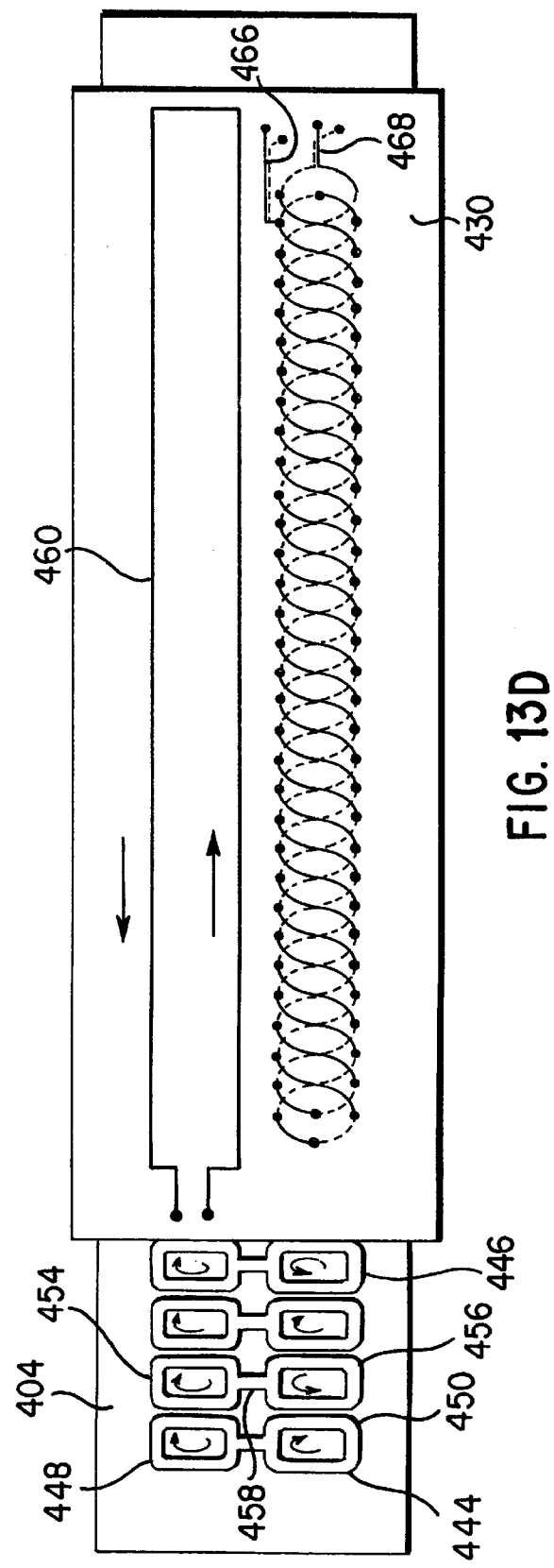
FIG. 13D shows a transducer according to the third preferred embodiment of the reduced offset inductive position transducer.

The first loop portions 448 and 454 of the coupling loops 444 and 446 under the transmitter loop 460 respond to the primary magnetic field generated by the transmitter 460 with an induced EMF that causes a current and magnetic field that counteracts the primary magnetic field produced in the transmitter winding 460. When the transmitter winding current flows counter-clockwise, as shown in FIG. 13D, the induced current in the first loop portions 448 and 454 of the coupling loops 444 and 446 flows counterclockwise. The current in the second loop portions 450 of the coupling loops 444 also flows clockwise. However, the current in the second loop portions 456 of the coupling loops 446 flow counter-clockwise because of the crossed connections 458 described above.

Therefore, the array of second loop portions 450 and 456 produces a secondary magnetic field with regions of opposite polarity periodically repeating along the scale under the receiver windings 466 and 468 of the read head unit 430. The secondary magnetic field has a wavelength λ equal to the period length for successive ones of the second loop portions 450, which is also equal to the period length for successive ones of the second loop portions 456. The receiver loops of the first and second windings 466 and 468 are designed to have the same wavelength λ as the scale pattern.

Hence, the receiver loops of the first and second receiver windings 466 and 468 will exhibit an induced EMF which produces a signal voltage whose amplitude will follow a periodic function with wavelength λ when the read head 430 is moved along the scale 404. Thus, except for the distinction of the single transmitter loop 460, this embodiment functions in the manner previously described for the embodiment shown in FIGS. 8 and 9. Similar to the previous discussion of second loop portions 250 and 256 of FIG. 8, the total area enclosed by the second loop portions 450 and 456 define a sensing track extending parallel to the measuring axis. In this case, the effective magnetic field within the sensing track includes some effect due to coupling to the fringe of the field produced by the transmitter winding 460. However, the current flow in the second loop portions produces a field in the sensing track that predominates over any other field.

Figure 14A:
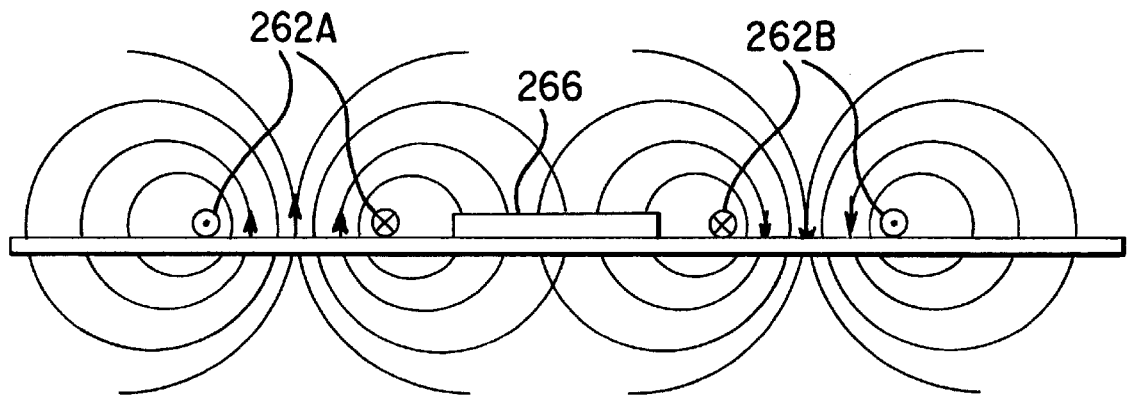
FIG. 14A shows a cross-sectional view of the first preferred embodiment of the reduced offset induced current position transducer of this invention.

FIG. 14A shows a cross-section of an inductive read-head according to the first preferred embodiment of this invention shown in FIG. 9. FIG. 14A illustrates how the primary magnetic field caused by the current in the transmitter loop 262A encircles the conductors and partly crosses through the receiver loops 266 and 268. FIG. 14A also shows how the primary magnetic field caused by the current in the transmitter loop 262B passes through the receiver loops 266 and 268 in the opposite direction from the primary magnetic field caused by the transmitter loop 262A.

Thus, the resulting net magnetic field through the first and second receiver windings 266 and 268 will be very close to zero and the extraneous direct coupling from the transmitter loops 262A and 262B to the first and second receiver windings will nullified. Experience and theoretical calculations show an improvement in the ratio of useful to extraneous signal components by a factor of more than 100 relative to the embodiment shown in FIG. 3.

Figure 14B:
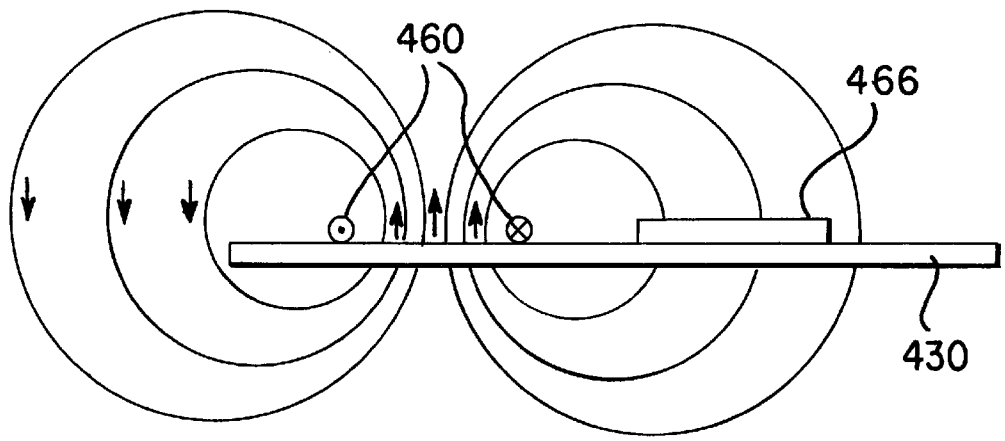
FIG. 14B shows a cross-sectional view of the second preferred embodiment of the reduced offset induced current position transducer of this invention.

FIG. 14B shows a cross-section of an inductive read-head according to the third preferred embodiment of this invention shown in FIG. 13D. FIG. 14B illustrates how the primary magnetic field caused by the current in the transmitter loop 460 encircles the conductors and partly crosses through the first and second receiver loops 466 and 468. Although this case fails to nullify the extraneous direct coupling, as provided in the first preferred embodiment, it still reduces the extraneous direct coupling by virtue of the separation of the transmitter loop 460 and the first and second receiver windings 466 and 468.

Furthermore, the secondary magnetic field having alternating polarities is provided in the vicinity of the first and second receiver windings 466 and 468. This eliminates other sources of offset. According to experience and theoretical calculations, the third embodiment shows an improvement in the ratio of useful to extraneous signal components by a factor of about 10 relative to the embodiment shown in FIG. 3.

It should be appreciated that the previous embodiments may be modified in certain aspects, while retaining many of their inventive benefits. For example, the coupling loops 446 (or 444) of FIG. 13A may be eliminated, while other aspects of this configuration remain the same. In this case, the secondary magnetic field provided in the vicinity of the first and second receiver windings 466 and 468 does not have a pattern of alternating polarities, as in the third embodiment. However, this design still reduces the extraneous direct coupling between transmitter and receiver windings by virtue of the separation of the transmitter loop 460 and the first and second receiver windings 466 and 468.

Furthermore, the use of multiple coupling loops provides the benefit of averaging out the error contributions of small, but significant, random deviations in segments of the winding configurations due to imperfect fabrication processes. Also, even if the coupling loops 446 (or 444) are eliminated, the fundamental operation of the transducer is still based on a moving structured field, defined by the coupling loops 444 (or 446) providing the primary excitation for the first and second receiver windings 466 and 468. It should also be noted that the vertical sections of the first loop portions 448 and 454 shown in FIG. 13D could be bridged by horizontal conductors at the top and bottom (not shown). In this case, the multiple coupling loops form a single coupling loop with a single elongated portion under the transmitter winding 460, and multiple serially connected loop portions 450 and 456 under the windings 466 and 468. Thus, the moving structured field is still maintained, although the function of the first coupling loop portions 448 and 454 is now provided by a single continuous winding.

In contrast, in the embodiment shown in FIG. 3, a static uniform field provided the primary excitation for the first and second receiver windings 140 and 142. The receiver winding output signals are based on how this uniform field is affected by moving elements which disturb the uniform excitation field in the vicinity of the first and second receiver windings 140 and 142. The moving structured field excitation approach of this invention provides an inherently superior signal, even if the coupling loops 446 (or 442) are eliminated.

Figure 15:
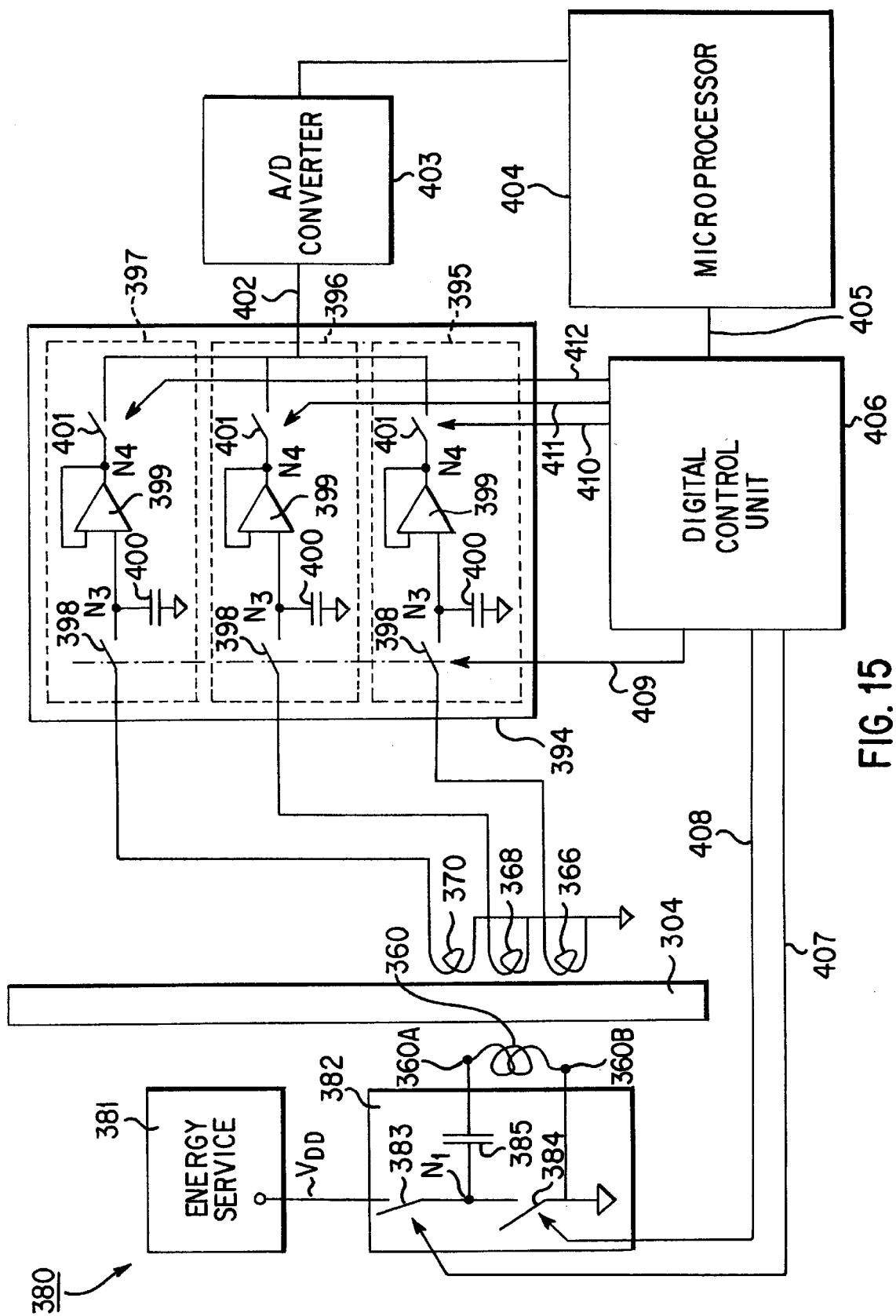
FIG. 15 is a block diagram of the read head shown in FIG. 10 and its associated signal processing circuits.

FIG. 15 shows a block diagram of the second preferred embodiment of the reduced offset induced current position transducer 300 using the three phase read head 330 shown in FIG. 10. Only the essential portions of the signal processing circuit needed to determine the position of the read head 330 relative to the scale 304 are shown in FIG. 15.

As shown in FIG. 15, the transmitter winding 360 is connected to a signal generator circuit 382 of the transmitter drive signal generator 380. The signal generator circuit 382 includes a first switch 383 serially connected to a second switch 384 between ground and a power supply voltage $V_{DD}$ from an energy source 381. One terminal of a capacitor 385 is connected to a node $N_1$ between the first and second switches 383 and 384. A second plate of the capacitor 385 is connected to the terminal 360A of the transmitter winding 360. The second terminal 360B of the transmitter winding 360 is connected to ground. Thus, the transmitter winding 360 forms the inductor in a LC resonant circuit with the capacitor 385.

The transmitter winding 360 is indirectly inductively coupled via the coupling loops 344 and 346 formed on the scale 304 to the first-third receiver windings 366, 368 and 370. The receiver windings 366, 368 and 370 are connected to a sample and hold circuit 394. In particular, the output of the first receiver 366 is connected to a first sample and hold subcircuit 395. The output of the second receiver 368 is connected to a second sample and hold subcircuit 396, while the output of the third receiver 370 is connected to a third sample and hold subcircuit 397.

Each of the three sample and hold subcircuits 395–397 includes a switch 398 receiving an output from the corresponding receiver loop 366, 368, or 370. The output of the switch 398 is connected to the positive input terminal of a buffer amplifier 399. One plate of a sample and hold capacitor 400 is connected to a node $N_3$ between the switch 398 and the buffer amplifier 399. The other plate of the sample and hold capacitor 400 is connected to ground. An output of the buffer amplifier 399 is connected to a switch 401. The negative input terminal of the buffer amplifier 399 is connected to the output of the buffer amplifier at a node $N_4$.

The outputs of the switches 401 of the three sample and hold subcircuits 395–397 are connected to a single output line 402 that is connected to an input of analog-to-digital (A/D) converter 403. The A/D converter 403 converts the output of the sample and hold circuit 394 from an analog value to a digital value. The digital value is output to a microprocessor 404 which processes the digital values from the A/D converter to determine the relative position between the read head 330 and the scale 304.

Each position within a wavelength can be uniquely identified by the microprocessor, according to known techniques and the equations previously disclosed herein. The microprocessor 404 also uses known techniques to keep track of the direction of motion and the number of wavelengths that are traversed to determine the total position for the transducer relative to an initial reference position.

The microprocessor 404 also controls the sequence of signal sampling by outputting a control signal over a signal line 405 to a digital control unit 406. The digital control unit 406 controls the sequence of transmission, signal sampling and A/D conversion by outputting control signals on the signal lines 407–412 to the transmitter drive signal generator 380 and the sample and hold circuit 394. In particular, as shown in FIG. 15, the digital control unit 406 outputs switch control signals over the signal lines 407 and 408 to the first and second switches 383 and 384, respectively, for controlling the transmitter excitation.

The digital control unit 406 outputs switch control signals on the signal lines 409–412 to the sample and hold circuit 394. In particular, the control signal 409 controllably opens and closes the switches 398 of the first-third sample and hold subcircuits 395–397 to connect the receiver windings 366, 368 and 370 to the sample and hold capacitors 400. When the control signal 409 controllably opens the switches 398, the signals received from the receiver windings 366, 368 and 370 are stored in the sample and hold capacitors 400. The switch control signals on the signal lines 410–412 are used to controllably connect the outputs of the buffer amplifiers 399 of one of the first-third sample and hold subcircuits 395–397, respectively, to the A/D converter 403 over the signal line 402.

Figure 16:
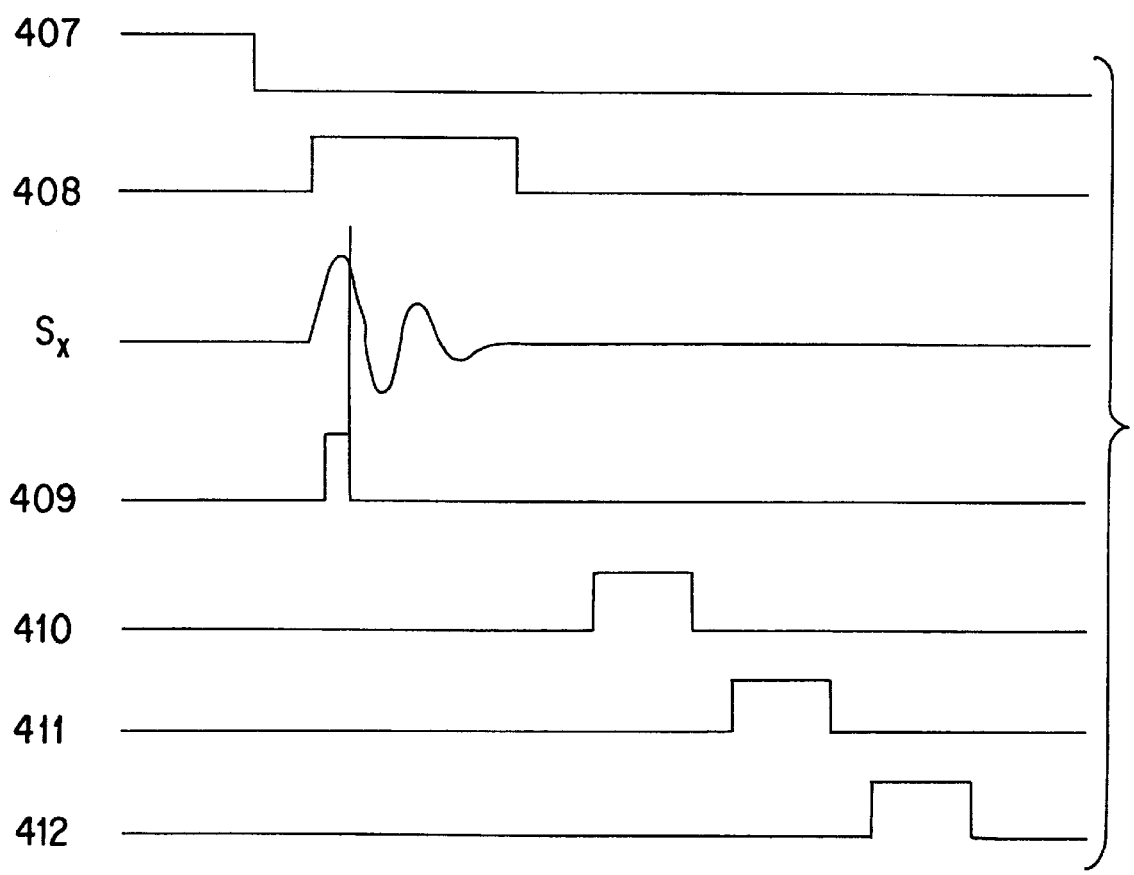
FIG. 16 is a timing diagram for one of the three channels of the electronic unit shown in FIG. 15.

FIG. 16 shows a timing diagram for generating the switch control signals 407–412 to obtain a position measurement. First, the switch control signal output on the signal lines 407 is set to a high state to close the switch 383. This charges up the capacitor 385 to the supply voltage $V_{DD}$. The switch control signal on the signal line 407 is then set to a low state to open the switch 383.

Next, the switch control signal output on the signal lines 408 is changed from a low state to a high state to close the switch 384. This allows the capacitor 385 to discharge through the corresponding transmitter winding 360. In particular, the capacitor 385 forms a resonant circuit with the transmitter windings 360 with a chosen resonant frequency on the order of several MHz. The resonance is a damped oscillation with a waveform corresponding essentially to the signal $S_X$ shown in FIG. 16.

The signal $S_X$ appears with the same time function on each of the receiver windings 366, 368 and 370. However, the amplitude and polarity of the signal $S_X$ appearing on each of the receiver windings 366, 368 and 370 depends on the position of the read head 330 relative to the scale 304, as shown in FIG. 11.

Before the signal $S_X$ on the receiver windings reaches a peak, the switch control signal on the signal line 409 changes from a low state to a high state to begin charging each of the sample and hold capacitors 400 of the sample and hold circuit 394. At a point just after, but approximately at, the peak of the signal $S_X$, the switch control signal on the signal line 409 returns to the low state to open the switches 398. This holds the amplitude of the signals $S_X$ for each of the three receiver windings on the corresponding one of the sample and hold capacitors 400 of the first-third sample and hold subcircuits 395–397. At some point thereafter, the switch control signal on the signal line 408 is returned to the low state to open the switch 384.

Next, at some time after the control signal 409 has returned to the low state, the switch control signal on the signal line 410 changes from the low state to the high state to close the switches 401 of the sample and hold subcircuit 395. This connects the sampled value held on the corresponding sample and hold capacitor 400 over the signal line 402 to the A/D converter 403. The A/D converter 403 converts the analog value on the signal line 402 to a digital value and outputs the digital value to the microprocessor 404. The switch control signal on the signal line 410 returns to the low state to open the corresponding switch 401. This sequence is then repeated for the switch control signals output on the signal lines 411 and 412 to connect the signals sampled by the sample hold subcircuits 396 and 397 to the A/D converter 403 over the signal line 402.

This process is repeated according to the program in the microprocessor. A program can easily be made that adapts the sampling rate of the system to the speed of movement of the transducer, thereby minimizing the current consumption. This operation is well known to those skilled in the art and thus will not be described in further detail herein.

The previously described signal processing system can be operated on very low power with the disclosed inductive position transducers, and other related inductive position transducers, if desired. For example, intermittently activating the drive signal generator 382 to support a signal processing system sampling frequency of about 1 kHz provides sufficient accuracy and motion tracking capability for most applications. To reduce power consumption, the drive signal generator duty cycle can be kept low by making the pulses relatively short. For example, for the 1 kHz sampling frequency described above, a suitable pulse width is about 0.1–1.0 µs. That is, the duty cycle of the pulses having sampling period of 1 ms is 0.01%–0.1%.

The resonant frequency of the capacitor 385 and the winding 360 is then preferably selected such that the peak of the voltage across the capacitor 385 occurs before the end of the 1.0 µs or less pulse. Thus, the resonant frequency is on the order of several megahertz, as previously disclosed. The corresponding magnetic flux will therefore be modulated at a frequency above 1 MHz, and typically of several megahertz. This is considerably higher than the frequencies of conventional inductive position transducers.

The inventors have determined that, at these frequencies, the currents generated in the scale 304 with the coupling loops 344 and 346 produce strong inductive coupling to the first-third receiver windings 366, 368 and 370. The EMFs generated in the first-third receiver windings 366, 368 and 370, and the resulting output signal, therefore respond strongly to variations in coupling loop position. This occurs despite the low duty cycle and low power used by the pulsed drive signal.

The strength of the response, combined with the low duty cycle and low power consumption, allows the inductive position transducer to make measurements while the drive signal generator 380 and the remainder of the signal processing electronic circuit shown in FIG. 15 draw an average current preferably below 200 µA, and more preferably below 75 µA, for lower power applications. It should be understood that "average current" as used herein means the total charge consumed over one or more measurement cycles, divided by the duration of the one or more measurement cycles, while the inductive position transducer is in normal use.

The inductive position transducers similar to the type disclosed herein can therefore be operated with an adequate battery lifetime using three or fewer commercially available miniature batteries or with a photo-electric cell. Further details regarding low power signal processing are disclosed in the incorporated references.

It should be appreciated that although the foregoing embodiments are shown with spatially uniform windings designated as the transmitter windings, and spatially modulated windings designated as the receiver windings, it will be apparent to one skilled in the art that the disclosed transducer winding configurations will retain all of their inventive benefits if the roles of the transmitter and receiver windings are "reversed" in conjunction with appropriate signal processing. One such appropriate signal processing technique is disclosed in reference to FIG. 21 of incorporated U.S. patent application Ser. No. 08/441,769. Other applicable signal processing techniques will be apparent to those skilled in the art.

Thus, while this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. An elongated linear scale, comprising:
   a slider assembly;
   an elongated scale having a measuring axis, the slider assembly movable along the measuring axis;
   at least one magnetic field generator, each magnetic field generator responsive to a drive signal to generate a first changing magnetic flux in a first flux region;
   at least one flux coupling loop, a first portion of the at least one flux coupling loop positionable within the first flux region and responsive to the first changing magnetic flux when positioned within the first flux region to produce a second changing magnetic flux in a second portion of the flux coupling loop in a second flux region that is separated from the first flux region; and
   at least one magnetic flux sensor;
   wherein:
      one of a) the at least one magnetic flux sensor or b) the at least one magnetic field generator includes an inductive area extending along the measuring axis, and the inductive area is spatially modulated along the measuring axis in a pattern including alternating increases and decreases in width,
      each magnetic flux sensor is positioned outside the first flux region to sense the second changing magnetic flux in the second flux region portion of at least one flux coupling loop, and
      each magnetic flux sensor is responsive to the second changing magnetic flux to generate an output signal which is a function of the relative position between the slide and the elongated scale.

2. The electronic linear scale of claim 1, wherein the inductive area comprises a plurality of alternating polarity regions.

3. The electronic linear scale of claim 2, wherein the pattern of alternating polarity regions comprises regions along a surface, the regions bounded by at least one conductor positioned on the surface in a prescribed pattern.

4. The electronic linear scale of claim 1, wherein the one of a) the at least one magnetic field generator or b) the at least one magnetic flux sensor which has the inductive area spatially modulated along the measuring axis is positioned on one of the slider assembly and the elongated scale, and the at least one flux coupling loop is positioned on the other one of the slider assembly and the elongated scale.

5. The electronic linear scale of claim 4, wherein the other of a) the at least one magnetic field generator and b) the at least one magnetic flux sensor is positioned on either the slider assembly or the elongated scale.

6. The electronic linear scale of claim 1, wherein in the absence of the at least one flux coupling loop, the output signal generated by each magnetic flux sensor is insensitive to the changing magnetic flux generated by each magnetic field generator.

7. The electronic linear scale of claim 1, wherein at least one of the at least one magnetic field generator, the at least one flux coupling loops and the at least one magnetic flux sensor are fabricated by printed circuit board processing.

8. The electronic linear scale of claim 1, further comprising:
   an energy supply source that outputs a power supply;
   a drive circuit that inputs the power supply and outputting a drive signal to the at least one magnetic field generator during each measurement cycle; and
   an analyzing circuit that inputs the output signal from each at least one magnetic field sensor, determines the position of the slider assembly relative to the elongate beam, and outputs a position signal indicative of the position of the slider assembly relative to the elongate beam at a first level of resolution.

9. The electronic linear scale of claim 8, wherein the drive circuit comprises a capacitor discharged through the at least one magnetic field generator.

10. The electronic linear scale of claim 9, wherein the capacitor and the at least one magnetic field generator form a resonant circuit.

11. The electronic linear scale of claim 8, wherein the analyzing circuit comprises a counter for counting fractions of cycles of the at least one output signal output from the at least one magnetic field sensor at a second level of resolution coarser than the first level of resolution in response to motion of the slider assembly along the measuring axis.

12. The electronic linear scale of claim 8, wherein each of a plurality of 3*N, where N is greater than or equal to 1, of magnetic flux sensors comprise identical inductive areas spatially modulated along the measuring axis with a periodic modulation having a wavelength W, and such inductive areas are offset from each other by a length O=W/3N along the measuring axis; and
   the analyzing circuit substantially eliminates the influence of signal components which are third harmonics of the wavelength W.

13. The electronic linear scale of claim 1, wherein the changing magnetic flux generated by the at least one magnetic field generator changes at a rate equivalent to an oscillation frequency of at least 1 MHz.

14. The electronic linear scale of claim 1, wherein the pattern including alternating increases and decreases in width comprises a periodic pattern having a selected wavelength.

15. The electronic linear scale of claim 14, wherein the portion of each coupling loop adjacent the periodic pattern spans, at most, one-half wavelength along the measuring axis.

16. The electronic linear scale of claim 14, wherein a first plurality of coupling loops of a first type are arranged along the measuring axis at a pitch equal to the wavelength.

17. The electronic linear scale of claim 16, wherein a second plurality of coupling loops of a second type are arranged along the measuring axis offset by one-half wavelength from the first plurality of coupling loops and at a pitch equal to the wavelength, and the coupling loops of the first and second type alternate along the measuring axis in at least the region adjacent to the periodic pattern.

18. The electronic linear scale of claim 17, wherein, in one of the first or second coupling loop types, the induced current produces the same polarity flux in the first flux region portion and the second flux region portion, and, in the other of the first or second coupling loop types, the induced current produces flux in the second flux region portion which is opposite in polarity to the flux induced in the first flux region portion.

19. The electronic linear scale of claim 17, wherein the first and second coupling loop types couple to the same magnetic flux generator region and are configured so that coupling loops of the first type extend in a first direction perpendicular to the measuring axis to couple to a first magnetic flux sensor region and the coupling loops of the second type extend in an opposite direction perpendicular to the measuring axis to couple to a second magnetic flux sensor region.

20. The electronic linear scale of claim 17, wherein the first and second coupling loop types couple to the same magnetic flux sensor region, but are configured so that coupling loops of the first type extend in a first direction perpendicular to the measuring axis to couple to a first magnetic flux generator region and the coupling loops of the second type extend in an opposite direction perpendicular to the measuring axis to couple to a second magnetic flux generator region.

21. The electronic linear scale of claim 1, wherein a) the at least one magnetic flux generator or b) the at least one magnetic flux sensor comprises two similar portions arranged symmetrically on opposite sides of the other of the at least one magnetic flux generator and the at least one magnetic flux sensor, such that in absence of coupling loops, the net flux through the magnetic flux sensor is substantially zero as a result of the symmetric configuration.

22. The electronic linear scale of claim 1, wherein the at least one flux coupling loop comprises a plurality of flux coupling loops arranged along the measuring axis and the measuring range of the sensor is determined by the extent of the plurality of coupling loops.

23. The electronic linear scale of claim 1, wherein each of a plurality of the inductive areas which are spatially modulated along the measuring axis comprises an area outlined by a patterned conductor insulated from other patterned conductors, and a plurality of such inductive areas at least partially overlap.

24. The electronic linear scale of claim 23, wherein each of a plurality of N inductive areas which are spatially modulated along the measuring axis is identical and is periodically modulated along the measuring axis with a selected wavelength W, and such inductive areas are offset from each other by a length O along the measuring axis, where O=W/2N for N equal to 2, and O=W/N for N greater than 2.

25. An electronic linear scale comprising:
a slider assembly;
an elongated scale having a measuring axis, the slider assembly movable along the measuring axis;
a low power energy supply source providing a power supply to a drive circuit;
the drive circuit connected to the power supply and responsive to a control signal to output an intermittent drive signal;
at least one magnetic field generator, each magnetic field generator responsive to the drive signal to generate a first changing magnetic flux in a first flux region;
at least one flux coupling loop, a first portion of the at least one flux coupling loop positionable within the first flux region and responsive to the first changing magnetic flux when positioned within the first flux region to produce a second changing magnetic flux in a second flux region proximate to a second portion of the flux coupling loop outside the first flux region;
at least one magnetic flux sensor, each magnetic flux sensor positioned outside the first flux region for sensing the second changing magnetic flux in the second flux region portion of the at least one flux coupling loop, and each magnetic flux sensor responsive to the second changing magnetic flux to generate an output signal which is a function of the relative position between the magnetic flux sensor and the at least one flux coupling loop; and
an analyzing circuit responsive to the output signal from at least one magnetic flux sensor to output an output signal indicative of the position of the slider assembly relative to the elongated scale at a first level of resolution.

26. The electronic linear scale of claim 25, wherein the drive circuit comprises a capacitor that discharges through the magnetic field generator.

27. The electronic linear scale of claim 26, wherein the capacitor and the magnetic field generator operate as a resonant circuit.

28. The electronic linear scale of claim 26, wherein the first changing magnetic flux changes at a rate equivalent to an oscillation frequency of at least 1 MHz in response to the intermittent drive signal.

29. The electronic linear scale of claim 26, wherein the intermittent drive signal comprises at least one pulse signal.

30. The electronic linear scale of claim 29, wherein the analyzing circuit determines changes in the relative position at a coarse level of resolution during each pulse interval, and determines the relative position at a finer level of resolution once during a plurality of pulse intervals.

31. The electronic linear scale of claim 29, wherein the analyzing circuit includes synchronous sampling means for sampling the output signal from at least one magnetic flux sensor synchronously with the pulse signal.

32. The electronic linear scale of claim 31, wherein the synchronous sampling uses sample timing based on an expected time delay between the pulsed signal and a peak in a response to a resonant circuit formed by the pulse generator components and the magnetic field generator components.

33. The electronic linear scale of claim 26, wherein:
at least one of a) the at least one magnetic flux sensor, and b) the at least one magnetic field generator includes an inductive area extending along the measuring axis, and the inductive area is spatially modulated along the measuring axis in a pattern including alternating increases and decreases in width;
the output signal from each magnetic flux sensor exhibits spatial cycles which are a function of a relative position between the magnetic flux sensor and the at least one flux coupling loop; and
the analyzing circuit comprises a counter for counting fractions of cycles of the output signal from at least one magnetic flux sensor in response to motion of the slider assembly along the elongated scale, at a second level of resolution coarser than the first level of resolution, the counter providing an approximate position of the slider assembly relative to the elongate beam.

34. The electronic linear scale of claim 33, wherein the counter is responsive at spatial intervals of at most ¼ cycle.

35. The electronic linear scale of claim 33, wherein the inductive area comprises a plurality of alternating polarity regions.

36. The electronic linear scale of claim 35, wherein the plurality of alternating polarity regions comprises regions of a surface bounded by at least one conductor positioned on the surface in a prescribed pattern.

37. A method for operating an electronic linear scale, comprising:

supplying power from a self-contained energy supply source to a drive circuit of the electronic linear scale;

outputting a drive signal from the drive circuit to at least one magnetic flux generator in response to a control signal, the at least one magnetic flux generator positioned on a first one of a slider assembly and an elongated scale.

generating a changing magnetic field in the at least one magnetic flux generator in response to the drive signal;

inducing a current in at least one flux coupling loop in response to the changing magnetic field, wherein the at least one flux coupling loop is positioned on the other of the slider assembly and the elongated scale of the electronic linear scale, the elongated scale having a measuring axis, the slider assembly being moveable relative to the elongated scale along the measuring axis, the at least one flux coupling loop being arranged along the measuring axis and each flux coupling loop extending across the measuring axis;

producing a spatially modulated time-varying magnetic field with at least one flux coupling loop in response to the current;

sensing the spatially modulated time-varying magnetic field using at least one magnetic flux sensor positioned on the first one of the slide assembly and the elongated scale;

generating a position signal based on the sensed field; and analyzing the position signal to generate an output indicative of a relative position of the slider assembly and the elongated scale.

38. The method of claim 37, wherein:

the spatially modulated time-varying magnetic field is generated and sensed in a sensing track positioned parallel to the measuring axis; and the spatially modulated time-varying magnetic field predominates the total magnetic field within the sensing track.

* * * * *